US011415716B2

(12) United States Patent
Clark et al.

(10) Patent No.: US 11,415,716 B2
(45) Date of Patent: Aug. 16, 2022

(54) SYSTEM AND METHOD OF LOCATING DOWNHOLE OBJECTS IN A WELLBORE

(71) Applicant: COLORADO SCHOOL OF MINES, Golden, CO (US)

(72) Inventors: Connor J. Clark, Midland, TX (US); Jennifer L. Miskimins, Golden, CO (US); Dana Gallegos, Midland, TX (US)

(73) Assignee: Colorado School of Mines, Golden, CO (US)

( * ) Notice: Subject to any disclaimer, the term of this patent is extended or adjusted under 35 U.S.C. 154(b) by 550 days.

(21) Appl. No.: 16/176,204

(22) Filed: Oct. 31, 2018

(65) Prior Publication Data

US 2019/0129047 A1 May 2, 2019

Related U.S. Application Data

(60) Provisional application No. 62/580,351, filed on Nov. 1, 2017.

(51) Int. Cl.
*E21B 47/095* (2012.01)
*G01V 1/137* (2006.01)
(Continued)

(52) U.S. Cl.
CPC .............. *G01V 1/137* (2013.01); *E21B 47/00* (2013.01); *E21B 47/06* (2013.01); *E21B 47/095* (2020.05);
(Continued)

(58) Field of Classification Search
CPC .. G01V 1/137; G01V 1/50; G01V 2210/1295; E21B 47/24; E21B 47/095; E21B 47/00; E21B 47/06
See application file for complete search history.

(56) References Cited

U.S. PATENT DOCUMENTS 4,783,769 A * 11/1988 Holzhausen ............. G01V 1/50
367/35
4,802,144 A 1/1989 Holzhausen et al.
(Continued)

FOREIGN PATENT DOCUMENTS

| EP | 0390526 | 10/1990 |
|---|---|---|
| WO | WO 2018/004369 | 1/2018 |
| WO | WO 2018/035400 | 2/2018 |

OTHER PUBLICATIONS

Validyne Engineering, Pressure Sensor Accuracy, Jul. 7, 2017, Validyne Engineering. p. 1 (Year: 2017).*
(Continued)

*Primary Examiner* — Isam A Alsomiri
*Assistant Examiner* — Abdallah Abulaban
(74) *Attorney, Agent, or Firm* — Sheridan Ross P.C.

(57) ABSTRACT

The present disclosure provides novel systems and methods of locating downhole objects in a wellbore, the condition of casing within the wellbore, and characteristics of a subterranean formation. More specifically, data associated with a hydraulic impulse in fluid in the wellbore is used to determine a location of a downhole object. Data associated with the hydraulic impulse is collected and then processed in the frequency domain to identify the location of the downhole object. The downhole object may be a tool positioned within the wellbore or a fracture network that communicates with the wellbore by a perforation through wellbore casing. The system and method of the present disclosure can also be used to identify locations of unintended holes or perforations in casing and other tubulars. One aspect of the present disclosure is a system and method of locating a downhole object by analyzing pressure data from a hydraulic impulse transmitted through a fluid in a wellbore and that reflects off of the downhole object.

21 Claims, 10 Drawing Sheets

(51) Int. Cl.
  *G01V 1/50*  (2006.01)
  *E21B 47/00* (2012.01)
  *E21B 47/06* (2012.01)
  *E21B 47/24* (2012.01)

(52) U.S. Cl.
  CPC ............... *E21B 47/24* (2020.05); *G01V 1/50* (2013.01); *G01V 2210/1295* (2013.01)

(56) References Cited

U.S. PATENT DOCUMENTS

| | | | |
|---|---|---|---|
| 4,907,204 | A | 3/1990 | Medlin |
| 5,093,811 | A | 3/1992 | Mellor et al. |
| 5,170,378 | A | 12/1992 | Mellor et al. |
| 6,364,015 | B1 | 4/2002 | Upchurch |
| 7,100,688 | B2 | 9/2006 | Stephenson et al. |
| 7,313,481 | B2 | 12/2007 | Moos et al. |
| 7,770,639 | B1 | 8/2010 | Pledger |
| 8,838,427 | B2 | 9/2014 | Segal et al. |
| 8,991,505 | B2 | 3/2015 | Fleckenstein et al. |
| 9,624,764 | B2 | 4/2017 | Fleckenstein et al. |
| 10,030,497 | B2 | 7/2018 | Dawson et al. |
| 2013/0213644 | A1* | 8/2013 | Buyers ............... E21B 41/0092 166/250.15 |
| 2016/0082405 | A1 | 3/2016 | Fomitchev-Zamilov |
| 2017/0096891 | A1 | 4/2017 | Gao et al. |
| 2017/0176622 | A1* | 6/2017 | Lemarenko ............. G01V 1/50 |
| 2018/0094521 | A1 | 4/2018 | Adamopoulos et al. |

OTHER PUBLICATIONS

Afshar et al., "Water hammer simulation by implicit method of characteristic," International Journal of Pressure Vessels and Piping, vol. 85, No. 12, Dec. 2008, pp. 851-859, abstract only.

Carey et al., "Analysis of Water Hammer Signatures for Fracture Diagnostics," SPE Annual Conference and Exhibition, Sep. 28-30, 2015, 25 pages, abstract only.

Carey, "Water hammer fracture diagnostics," Thesis Presented to the Faculty of the Graduate School of the University of Texas at Austin, Dec. 2014, 121 pages.

Clark et al., "Diagnostic Applications of Borehole Hydraulic Signal Processing," Unconventional Resources Technology Conference, URTeC: 2902141, Jul. 23-25, 2018, 18 pages.

Clark, "Frequency spectrum analysis of water hammer events during hydraulic fracturing and the associated diagnostic applications," Thesis Submitted to the Faculty of the Colorado School of Mines, 2017, 142 pages.

Dunham et al., "Hydraulic fracture conductivity inferred from tube wave reflections," SEG Technical Program Expanded Abstracts, Sep. 28, 2017, pp. 947-952, abstract only.

Iriarte et al., "Using Water Hammer Characteristics as a Fracture Treatment Diagnostic," SPE Oklahoma City Oil and Gas Symposium, Mar. 27-31, 2017, 14 pages, abstract only.

* cited by examiner

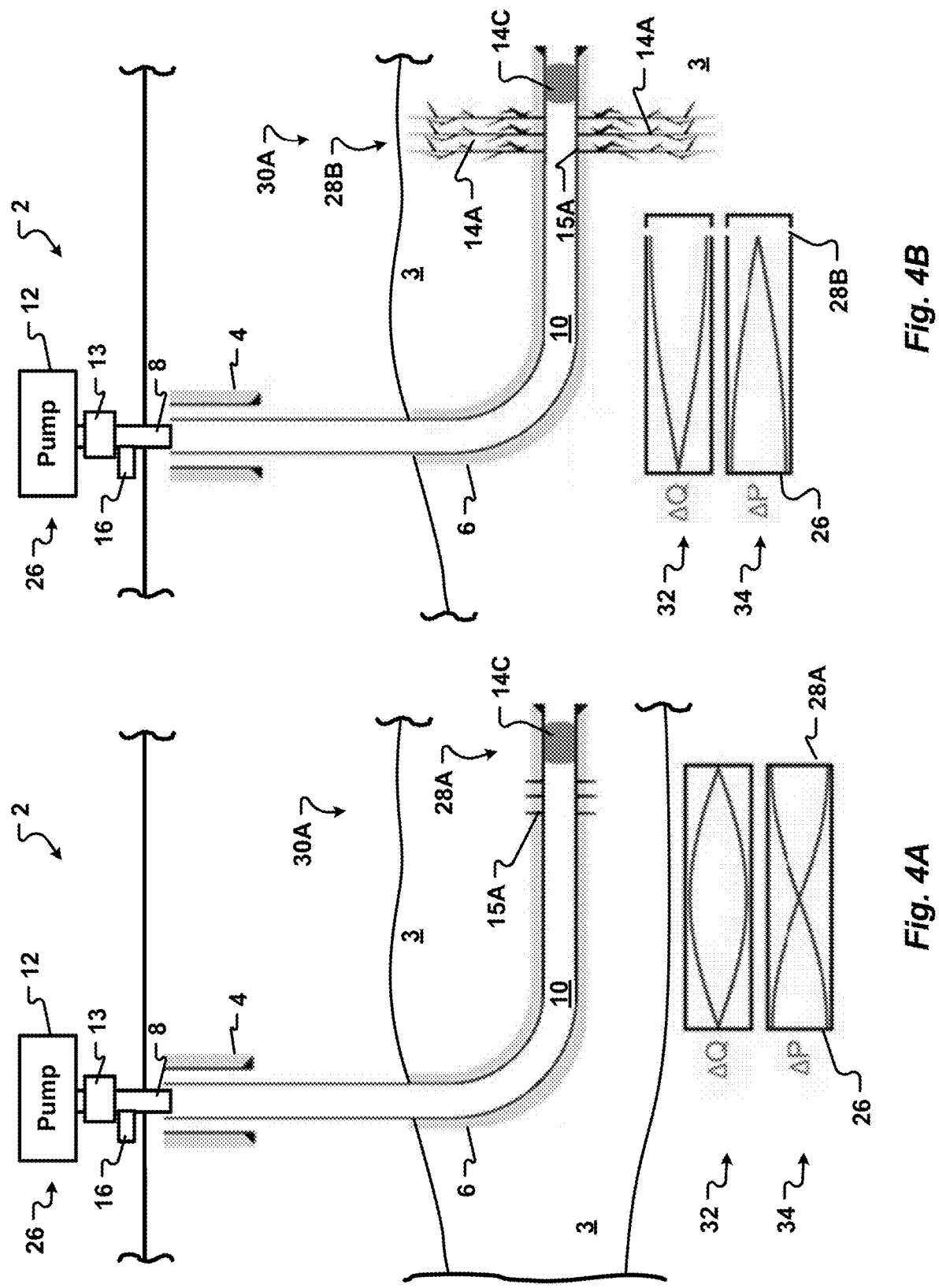

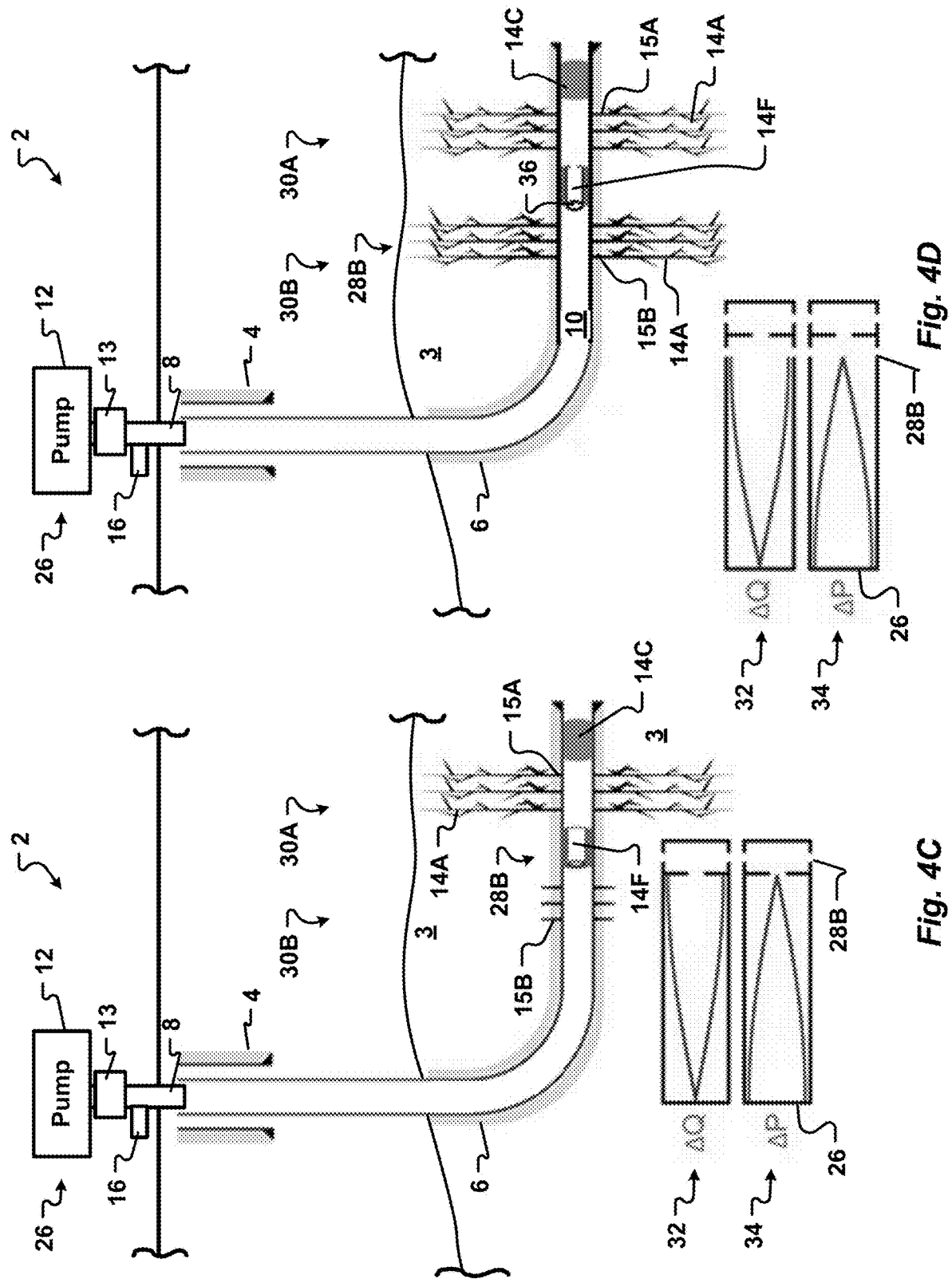

SYSTEM AND METHOD OF LOCATING DOWNHOLE OBJECTS IN A WELLBORE

CROSS REFERENCE TO RELATED APPLICATIONS

This application claims the priority and benefits under 35 U.S.C. § 119(e) to U.S. Provisional Patent Application Ser. No. 62/580,351, entitled "System and Method of Locating Downhole Objects in a Wellbore" which was filed Nov. 1, 2017 and is incorporated herein in its entirety by reference.

FIELD

The present disclosure relates generally to systems and methods of locating objects in a wellbore. More particularly, embodiments of the present disclosure relate to locating objects at various distances in the wellbore and within the adjoining reservoir using data associated with a pressure event, such as a hydraulic impulse within a fluid of the wellbore.

BACKGROUND

Wellbores used to extract hydrocarbons from a subterranean reservoir involve a series of assembly and testing operations before hydrocarbon production can begin. A wellbore is formed by drilling a borehole into the reservoir. Portions of the borehole may be lined with a casing. The casing generally comprises a string of steel pipes that are connected together by casing collars. The casing can be embedded by cement positioned in an annular space between an interior of the borehole and the exterior of the casing to prevent fluid migration within the annulus.

A downhole tool (such as a bridge plug or other device) may be positioned at various locations within the wellbore during assembly, treatment, and testing operations. A wireline, coiled tubing or drill string can be used to position the downhole tool in the wellbore. The depth of the downhole tool can be measured by a counter associated with the wireline or by measuring the length of pipe or coiled tubing inserted into the wellbore.

The downhole tool can be used to perform an operation within the wellbore. For example, during hydraulic fracturing of a target producing zone, a downhole tool, such as an isolation plug, may be positioned within the wellbore to isolate the target producing zone from other portions of the wellbore. Perforations can then be formed through the casing within the target producing zone to provide access to the reservoir. The perforations may be formed by a perforation gun. Fluid is then pumped into the wellbore at high pressure to fracture the reservoir. The induced fractures provide communication paths from the reservoir through a fracture network to the perforations and into the casing. The characteristics and placement of the perforations and fracture network can have a significant influence on productivity of a well.

After the downhole tool has been used during an operation, it may be necessary to remove the downhole tool from the wellbore or to move the downhole tool to another location within the wellbore. This typically includes locating the precise depth of the tool with respect to the various formations which will be produced. Downhole tools can move after being placed within the wellbore due to forces exerted against the downhole tool or due to vibrations within the wellbore. For example, an isolation plug may move further (or deeper) into the wellbore. This may happen when pressure is increased within the wellbore during hydraulic fracturing. The isolation plug may also move further into the wellbore before hydraulic fracturing treatment for a variety of reasons. Occasionally, the isolation plug may move upwardly from an intended location. Additionally, the location of some downhole tools may not be recorded accurately or may not be known. Accordingly, it is frequently necessary to determine a location of a downhole tool within a wellbore. Further, to achieve high efficiency of a stimulation during hydraulic fracturing treatment of a multi-stage horizontal wellbore, it is also important to ensure that treatment fluids and proppant are injected into the fractures within the subterranean reservoir over a designed interval of the target producing zone. This may not occur if an isolation plug has moved from an intended location before, or during, the hydraulic fracturing treatment. If the isolation plug moves before or during hydraulic fracturing treatment, treatment fluids and proppant may flow into a previously treated stage rather than into the perforations of the currently treated stage as planned.

Some methods of identifying locations of downhole tools are known. There are also a few diagnostic methods available to verify that the stimulation treatment is taking place at the intended interval of the target producing zone. However, these methods all typically require additional time, equipment, or entry into the wellbore. One method includes adding instruments to the downhole tool. The instruments transmit signals that are detected by a sensor and used to identify the location of the downhole tool. This method adds expense and complexity to the downhole tool. The method does not always work because the instruments on the downhole tool occasionally malfunction or fail such that the method may not successfully or accurately identify the location of the downhole tool. Additionally, this method cannot be used to locate other downhole objects within the wellbore or the locations of fractures in the producing formation.

Accordingly, there is an unmet need for a system and method of quickly, efficiently, and inexpensively locating downhole objects, fractures in a producing interval of a subterranean reservoir, and perforations or leaks within a wellbore.

SUMMARY

The present disclosure describes various embodiments of new and useful systems and methods of locating a downhole object in a wellbore, determining the condition of casing or other tubulars, assessing the effectiveness of a hydraulic fracturing treatment, and determining a characteristics of a subterranean formation that are more effective than the prior art and which do not include some of the costs and disadvantages of the prior art. One aspect of the disclosure is a system and method of locating a downhole object passively. In one embodiment, the downhole object is a tool. Additionally, or alternatively, the downhole object can be a feature that is associated with the wellbore, such as a fracture or a production flow path from a subterranean reservoir. In another embodiment, the system and method of the present disclosure can be used to locate the position of a downhole tool that is not modified for use with the system and method. More specifically, in one embodiment no additional instruments or equipment are positioned within the wellbore or added to the downhole tool being located. Further, the system and method of the present disclosure can locate the position of a downhole object that does not generate electrical or acoustic signals in contrast to some prior art devices that attempt to locate a downhole object based upon a signal generated by the downhole object.

Another aspect of the present disclosure is a system and method of locating a downhole object by analyzing a pressure pulse transmitted through a fluid in a wellbore after the pressure pulse has reflected off of the downhole object. In one embodiment, the pressure pulse is a "hydraulic impulse" which is also known as a "water hammer." In one embodiment, an impulse used to generate the water hammer has a predetermined impulse. The hydraulic impulse can be generated by activating or shutting down a pump, or opening or closing a valve associated with the wellbore. The hydraulic impulse can be generated during a hydraulic fracture treatment of a portion of the wellbore. The hydraulic impulse can be sensed and analyzed with surface equipment. Accordingly, in one embodiment, the system and method of the present disclosure does not require entering the wellbore or positioning a sensor downhole within the wellbore. The surface equipment can include a sensor and a control system. The sensor can be configured to collect data on a pressure of a fluid within the wellbore over a predetermined period of time.

It is one aspect of the present disclosure to provide a method of locating a downhole object in a wellbore in a hydrocarbon reservoir by analyzing data associated with a pressure event within a fluid of the wellbore. The method generally includes one or more of: (1) inducing a pressure event in a fluid within the wellbore; (2) measuring the pressure of the fluid over a period of time; (3) identifying a pressure pulse reflected from the downhole object in the pressure measurements; and (4) determining a location of the downhole object with the pressure pulse. The pressure event may be a water hammer or a hydraulic impulse.

In one embodiment, the downhole object is one of a tool and a feature associated with the wellbore or producing formation. In one embodiment, the downhole object is a mechanical tool located in a casing within the wellbore, such as an isolation plug. The downhole object can also be a perforation or an opening through the casing or a fracture in the hydrocarbon reservoir. In one embodiment, the downhole object is an unintended hole or perforation in the casing or other tubular associated with the wellbore.

In one embodiment, inducing the pressure event comprises shutting off an injection of a fluid into the wellbore. In one embodiment, shutting off the injection of the fluid comprises shutting down a pump used to inject the fluid into the wellbore. In one embodiment, shutting off the injection generates a hydraulic impulse with a predetermined amplitude. Shutting off the injection may include rapidly shutting down the pump used to inject the fluid into the wellbore, for example by going from a treating rate to zero in one step. Inducing the pressure event can also include opening or closing a valve. In one embodiment, the pressure event is induced when pressure in the wellbore and surface treating equipment equalize.

Measuring the pressure of the fluid includes recording a pressure of the fluid at a frequency of greater than 1 Hz. In one embodiment, the pressure is recorded at a frequency of at least approximately 10 Hz. In another embodiment, the fluid pressure is measured at a rate of between approximately 2 Hz and approximately 2 kHz. In one embodiment, a sensor with a sample rate at least approximately 30 Hz is used to measure the pressure of the fluid. The sensor can be positioned at the surface. In another embodiment, the sensor samples data at a rate of between approximately 25 Hz and approximately 75 Hz.

Another aspect of the present disclosure is a system to locate a downhole object in a wellbore or an anomaly in a geologic formation. The system generally includes, but is not limited to, one or more of: (1) a pump associated with a wellbore; (2) a valve associated with the wellbore; (3) a sensor configured to determine a pressure of a fluid within the wellbore; and (4) a control system that receives data from the sensor, the control system being programmed to determine a location of the downhole object or the formation anomaly with the sensor data. In one embodiment, the control system can determine the location of the downhole object based on a frequency included in a pressure event recorded by the sensor.

The pressure event may be a hydraulic impulse. The hydraulic impulse may be generated by one or more of activating the pump, deactivating the pump, opening a valve associated with the wellbore, and closing the valve.

The control system can determine variations in the pressure of the fluid by analyzing the sensor data. The variations in the pressure can be associated with the hydraulic impulse. Determining the location of the downhole object may include determining a distance from a surface boundary to the downhole object.

In one embodiment, the control system is operable to convert the sensor data into a hydraulic oscillation frequency. Optionally, the control system can determine a plurality of harmonic frequencies in the sensor data. In one embodiment, a Fourier Transform or a Fast Fourier Transform is used to determine the harmonic frequencies.

The sensor can be positioned at the surface. More specifically, the sensor can be positioned a known distance from the surface boundary defined by a pump, a valve, or other surface equipment at the wellhead. The sensor is operable to determine the pressure of the fluid at a predetermined sample rate. In one embodiment, the sensor is configured to determine the pressure at a sample rate of between approximately 1 Hz and approximately 1 kHz. The sample rate can be greater than approximately 1.5 Hz. In another embodiment, the sample rate of the sensor is at least approximately 30 Hz. In another embodiment, the sensor samples pressure data at a rate of between approximately 25 Hz and approximately 75 Hz.

The sensor can determine the pressure of the fluid for a predetermined period of time during which the hydraulic impulse reflects within the wellbore. The sensor can collect data associated with the fluid pressure at one or more periods. Optionally, the sensor can collect data at the sample rate for up to approximately 10 minutes. In another embodiment, the sensor can collect data from approximately 2 minutes to approximately 15 minutes.

The sensor is operable to measure the pressure of the fluid at a predetermined accuracy. In one embodiment, the sensor can measure the fluid pressure to within approximately 1 pound per square inch (PSI). The sensor is generally accurate to within approximately 0.01% of a measured value, +/−0.015%. Accordingly, on a typical measurement of 5,000 PSIG, the error of the sensor may be less than approximately 1 PSI. In another embodiment, the sensor can measure a change in the fluid pressure greater than approximately 1 PSI. In another embodiment, the sensor can measure a fluid pressure of up to approximately 15,000 PSI.

One suitable sensor that can be used with the system and method of the present disclosure is a quartz-crystal transducer. The quartz-crystal transducer can include two or more calibrated quartz crystals.

The pump is configured to inject fluid into the wellbore at a predetermined rate. In one embodiment, the pump, or a plurality of pumps connected in parallel or series, can inject the fluid at up to approximately 100 bbl/minute or approximately 4,200 gallons/minute. In one embodiment, the control system is configured to control operation of the pump. Accordingly, the control system can alter the predetermined rate at which the pump injects fluid into the wellbore. Additionally, the control system can send a signal to the pump to stop, start, or reverse the flow of fluid to the wellbore. The control system can optionally control the valve.

Another aspect of the present disclosure is a method of locating a downhole object in a wellbore. The method generally comprises: (1) generating a hydraulic impulse in a fluid in the wellbore; (2) collecting data on energy reflected by the downhole object; and (3) determining a distance that the reflected energy has travelled through the fluid. In one embodiment, the downhole object is one of a downhole tool, an anomaly in the wellbore, and a fracture. The anomaly can be one or more of a fracture depth, a fracture density, a fracture length, a fracture permeability or flow characteristic, a perforation density, and a penetration depth. Additionally, or alternatively, the anomaly can be an unintended hole, fracture or perforation in a tubular associated with the wellbore, such as a casing of the wellbore. In one embodiment, a non-transitory computer readable medium including instructions to perform the method is provided, the instructions executable by a processor of a control system.

Collecting data on energy rejected by the downhole object can include measuring a pressure of the fluid over a period of time. The pressure can be measured by a sensor positioned at the surface.

Optionally, generating the hydraulic impulse comprises altering a flow rate of a pump associated with the wellbore. Additionally, or alternatively, the hydraulic impulse can be generated by one or more of activating the pump, deactivating the pump, opening a valve associated with the wellbore, and closing the valve.

Yet another aspect of the disclosure is a system configured to determine a location of a downhole object within a wellbore or associated with an adjoining geologic formation or subterranean reservoir, such as a fracture in the geologic formation. The system generally includes, but is not limited to, one or more of: (1) a pump associated with a wellbore, the pump configured to inject a fluid into the wellbore at a predetermined rate; (2) a sensor to collect data related to a hydraulic impulse reflected off of the downhole object at one or more locations in the wellbore; and (3) a control system to receive data collected by the sensor and determine a distance to the downhole object that reflected the hydraulic impulse. The distance can be measured from a surface boundary defined by the pump or a valve at the wellhead. The downhole object can be a plug or a perforation in a casing or other tubular associated with the wellbore. The perforation can be intentionally or inadvertently formed.

In one embodiment, the control system includes at least a processor, a memory, and instructions executable by the processor stored in the memory. In one embodiment, the control system is programmed to determine at least one fundamental and harmonic frequency in data collected by the sensor.

The data collected by the sensor can include a pressure of the fluid. The sensor can measure the pressure a plurality of times during a period of time.

Optionally, the control system can send a signal to alter operation of the pump. More specifically, the control system can start, stop, reverse, and change a rate at which the pump injects fluid into the wellbore.

The system can further include a valve associated with the wellbore. The valve can be actuated to generate the hydraulic impulse. For example, the hydraulic impulse can be generated by opening or closing the valve. In one embodiment, the valve may be actuated by a signal transmitted by the control system.

It is one aspect of the present disclosure to provide a method of locating a position of a downhole object in a wellbore or an anomaly in a subterranean formation. The method comprises: (1) generating a hydraulic impulse in a fluid in the wellbore; (2) collecting data on pressure in the fluid as the hydraulic impulse reflects between a surface boundary and a downhole boundary; (3) transforming the collected data into frequency domain data; and (4) determining a location of the downhole object or the formation anomaly. In one embodiment, the method can be performed by a control system including a processor, a memory, and instructions stored on the memory. Another aspect is a non-transitory computer readable medium including instructions configured to cause a processor of a control system to perform the method.

Generating the hydraulic impulse can include one or more of altering a flow rate of a pump injecting fluid into the wellbore, opening a valve, and closing a valve. The surface boundary is generally defined by the furthest point of backflow that can be reached in the hydraulic system of the wellbore. Accordingly, the surface boundary can be the pump or the valve depending upon the condition of equipment at the wellhead.

The data can be collected by a pressure sensor positioned at the surface. The sensor can be a predetermined distance from the surface boundary.

The downhole boundary from which the hydraulic impulse reflects is one of the downhole object or the formation anomaly. The method can include determining whether the downhole boundary is an open boundary or a closed boundary. The downhole object can be one of a plug in the wellbore, a downhole tool positioned within a casing in the wellbore, or a perforation through the casing. In addition or alternatively, the downhole object can be an unintended hole or perforation in the casing or other tubular associated with the wellbore.

The method can further include detrending the collected data. In one embodiment, transforming the collected data into frequency domain data comprises applying a Fourier transform to the collected data.

Optionally, the method can include identifying component frequencies in the frequency domain data. The component frequencies are associated with pressure peaks in the frequency domain data. In one embodiment, the method includes normalizing a component frequency of a second peak identified in the frequency domain data to determine a second normalized fundamental frequency of the hydraulic impulse. The second peak has a second frequency that is higher than a first frequency of a first peak.

Optionally, a velocity of a wave in the wellbore can be determined. The velocity of the wave can be determined before the hydraulic impulse is generated. In one embodiment, the velocity of the wave is determined at one or more pressures as described herein in conjunction with FIG. 10. The wave velocity to can optionally be used to determine the location of the downhole object or the formation anomaly. More specifically, the method may include selecting the velocity of a wave determined for a pressure approximately equal to the pressure of the fluid when the hydraulic impulse was generated.

In one embodiment, the location of the downhole object or the formation anomaly is determined based on a velocity of a wave in the wellbore and at least one normalized fundamental frequency of the hydraulic impulse. Optionally, the at least one normalized fundamental frequency comprises one or more of a second, a third, a fourth, a fifth, and a sixth normalized fundamental frequency.

The formation anomaly can be one or more of: (i) a fracture depth, (ii) a fracture density, (iii) a fracture length, (iv) a fracture permeability, (v) a fracture flow characteristic, (vi) a perforation density, and (vii) a penetration depth.

The method may further include determining that an isolation plug failed when the location of the downhole object is greater than a depth at which the isolation plug was set. Additionally, the method can include determining that a hydraulic treatment did not successfully result in the formation of a fracture network when the location of the downhole object is greater than the planned depth of the fracture network. The method can also include determining that the downhole object is an unintended fracture or perforation in the casing or other tubular when a distance to the downhole object does not match the known depth of downhole tools or objects, such as the location of the isolation plug or an intentionally formed perforation in the casing.

Another aspect of the present disclosure is a non-transitory computer readable medium comprising a set of instructions stored thereon that, when executed by a processor of a control system, cause the processor to determine a distance to a downhole object in a wellbore, a characteristic of a subterranean formation, or an anomaly in the subterranean formation. The instructions include: (1) an instruction to receive data collected over time on a pressure in a fluid within the wellbore, the pressure data being collected as a hydraulic impulse reflects in the wellbore between the downhole object and a surface boundary; (2) an instruction to transform the received data into frequency domain data; and (3) an instruction to determine a distance to the downhole object using the frequency domain data. The pressure data can be collected by a sensor positioned at the surface proximate to the wellhead. The surface boundary is generally defined by the furthest point of backflow that can be reached in the hydraulic system of the wellbore. Accordingly, the surface boundary can be the pump or the valve depending upon the condition at the wellhead. In one embodiment, the distance is measured from the surface boundary to the downhole object.

The downhole object can be a plug in the wellbore or a downhole tool. The formation anomaly can be one or more of: a fracture depth, a fracture density, a fracture length, a fracture permeability, a fracture flow characteristic, a perforation density, and a penetration depth. Additionally, the downhole object can be a fracture, a hole, or a perforation in a casing or other tubular of the wellbore. The perforation can be intentionally formed, for example by a perforation gun as part of a hydraulic fracturing treatment. Alternatively, the fracture, the hole, or the perforation can be unintentionally or inadvertently created during the assembly, treatment, and testing operations associated with bringing the wellbore into production.

The instructions can include an instruction to detrend the received data. Another instruction can be to apply a Fourier transform to the received data to transform the received data into the frequency domain data. One instruction can be to identify a component frequency in the frequency domain data. The component frequency can be associated with a pressure peak in the frequency domain data.

The instructions can further include an instruction to normalize a second component frequency identified in the frequency domain data.

In one embodiment, the distance to the downhole object is determined based on a velocity of a wave in the wellbore and at least one normalized fundamental frequency of the hydraulic impulse identified in the frequency domain data. Optionally, the at least one normalized fundamental frequency comprises one or more of a second, a third, a fourth, a fifth, and a sixth normalized fundamental frequency.

Still another aspect of the disclosure is a system configured to determine a location of a downhole object in a wellbore or a characteristic of a subterranean formation, comprising: (1) a sensor to collect data over time on a pressure of a fluid within the wellbore, the pressure data being collected as a hydraulic impulse travels in the wellbore between the downhole object and a surface boundary; and (2) a control system including at least a memory, a processor in communication with the memory, and instructions stored on the memory and executable by the processor, the control system operable to: (A) receive the pressure data collected by the sensor; (B) transform the pressure data into frequency domain data; and (C) determine a distance to the downhole object or a characteristic of the subterranean formation using the frequency domain data.

The sensor can be positioned at the surface. In one embodiment, the sensor is operable to collect data on a pressure in the fluid at a sample rate of at least approximately 1.5 Hz.

The control system can be further operable to determine at least one harmonic frequency in the pressure data collected by the sensor. Optionally, the control system is further operable to at least one of: (i) detrend the pressure data; and (ii) apply a Fourier transform to the detrended data or the pressure data to transform the pressure data into the frequency domain data.

The distance to the downhole object can determined using a normalized fundamental frequency of one or more peaks identified in the frequency domain data. In one embodiment, the one or more peak comprise a second peak, a third peak, a fourth peak, a fifth peak, and a sixth peak identified in the frequency domain data. In another embodiment, a first peak identified in the frequency domain data is discarded and not used to determine the distance to the downhole object.

The surface boundary is generally defined by the furthest point of backflow that can be reached in the hydraulic system of the wellbore. Accordingly, the surface boundary can be a pump or a valve depending upon the condition at the wellhead. The distance to the downhole object can be measured from the surface boundary. In one embodiment, the sensor is a known distance from the surface boundary.

The downhole object can be a plug, a fracture, a hole, or a perforation in a casing or other tubular of the wellbore. The perforation can be intentionally formed, for example by a perforation gun as part of a hydraulic fracturing treatment. Alternatively, the fracture, the hole, or the perforation can be unintentionally or inadvertently created during the assembly, treatment, and testing operations associated with bringing the wellbore into production.

One aspect of the present disclosure is a method of monitoring a hydraulic fracturing treatment of a wellbore formed in a subterranean reservoir. The method generally includes, but is not limited to: (1) setting an isolation plug at a first depth in the wellbore; (2) forming perforations through casing in the wellbore, the perforations being at a second depth that is less than the first depth; (3) generating a hydraulic impulse in a fluid within the wellbore, the hydraulic impulse subsequently reflecting off of a downhole boundary comprising one of the isolation plug and the perforations; (4) collecting data on a pressure of the fluid associated with the hydraulic impulse; and (5) determining if the hydraulic fracturing treatment of the wellbore was effective. The hydraulic fracturing treatment can occur before the collecting of the data on pressure of the fluid. In one embodiment, the hydraulic fracturing treatment can include, but is not limited to, injecting a fluid and a proppant, such as sand, into the wellbore at high pressure in order to induce hydraulic fractures.

Another aspect is a non-transitory computer readable medium including instructions configured to cause a processor to perform the method of monitoring the hydraulic fracturing treatment of the wellbore. It is another aspect of the present disclosure to provide a control system operable to perform the method of monitoring the hydraulic fracturing treatment of the wellbore.

A sensor positioned at the surface can be used to collect the pressure data. The sensor can be configured to measure the pressure of the fluid a plurality of times within a predetermined period of time. For example, the sensor can measure the pressure as the hydraulic impulse reflects between the downhole boundary and a surface boundary. The surface boundary is generally defined by the furthest point of backflow that can be reached in the hydraulic system of the wellbore. Accordingly, the surface boundary can be defined by a valve at the wellhead, a pump, a backflow valve between the pump and the wellhead, or other equipment depending upon the configuration at the wellsite. In some configurations, the pump is the furthest point of backflow that can be reached in the hydraulic system and defines the surface boundary.

Optionally, the hydraulic impulse can be generated by altering a rate at which fluid is pumped into the wellbore. For example, the flow rate can be increased, decreased, or reduced to zero by activating a pump associated with the wellbore, deactivating the pump, or changing the rate of the pump. Additionally, or alternatively, the hydraulic impulse may optionally be generated by opening or closing a valve associated with the wellbore to alter the pressure of the fluid in the wellbore.

Determining if the hydraulic fracture treatment was effective can include determining a distance to the downhole boundary which reflected the hydraulic impulse. The distance can be measured from the surface boundary of the wellbore to the downhole boundary. When the distance to the downhole boundary is approximately equal to the second depth at which the perforations were formed, the hydraulic fracturing treatment formed a fracture network associated with the perforations and the treatment was effective. In addition, when the distance to the downhole boundary is approximately equal to the second depth, the isolation plug did not fail during the hydraulic fracturing treatment. More specifically, when the distance to the downhole boundary is approximately equal to the second depth of the perforations, fluid pumped into the wellbore during the hydraulic fracturing treatment formed a fracture network in the subterranean reservoir and the fracture network communicates with the perforations. In this manner, the perforations define an open downhole boundary which reflects the hydraulic impulse.

Alternatively, if the distance to the downhole boundary is approximately equal to the first depth, or greater than the first depth, the hydraulic fracturing treatment was not successful. More specifically, the fluid pumped into the wellbore during the hydraulic fracturing treatment did not successfully result in the formation of a fracture network at the second depth of the perforations. Alternatively, fractures created within the fracture network formed by the hydraulic fracturing treatment may not have been of a sufficient size to create an open downhole boundary at the second depth. If the distance to the downhole boundary is greater than the first depth, then the distance is an accurate indication that the isolation plug moved downhole and deeper into the wellbore during the hydraulic fracturing treatment. In this case, it is possible that treatment fluid and proppant have been pumped into a lower production interval of the subterranean reservoir.

If the distance to the downhole object is less than the second depth, the downhole object that reflected the hydraulic impulse may be an unintended hole or perforation in the casing uphole from the perforations. The unintended hole could define an open boundary that would reflect the hydraulic impulse.

As will be appreciated, other embodiments are possible using, alone or in combination, one or more of the features set forth above or described below. For example, it is contemplated that various features and devices shown and/or described with respect to one embodiment may be combined with or substituted for features or devices of other embodiments regardless of whether or not such a combination or substitution is specifically shown or described herein.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

Unless otherwise indicated, all numbers expressing quantities, dimensions, conditions, and so forth used in the specification and claims are to be understood as being modified in all instances by the term "about." Accordingly, unless otherwise indicated, all numbers expressing quantities, dimensions, conditions, ratios, ranges, and so forth used in the specification and claims may be increased or decreased by approximately 5% to achieve satisfactory results. In addition, all ranges described herein may be reduced to any sub-range or portion of the range, or to any value within the range without deviating from the present disclosure.

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description, Abstract, and Claims themselves.

The term "automatic" and variations thereof, as used herein, refer to any process or operation done without material human input when the process or operation is performed. However, a process or operation can be automatic, even though performance of the process or operation uses material or immaterial human input, if the input is received before the performance of the process or operation. Human input is deemed to be material if such input influences how the process or operation will be performed. Human input that consents to the performance of the process or operation is not deemed to be "material."

The term "bus" and variations thereof, as used herein, can refer to a subsystem that transfers information and/or data between various components. A bus generally refers to the collection communication hardware interface, interconnects, bus architecture, standard, and/or protocol defining the communication scheme for a communication system and/or communication network. A bus may also refer to a part of a communication hardware that interfaces the communication hardware with other components of the corresponding communication network. The bus may be for a wired network, such as a physical bus, or wireless network, such as part of an antenna or hardware that couples the communication hardware with the antenna. A bus architecture supports a defined format in which information and/or data is arranged when sent and received through a communication network. A protocol may define the format and rules of communication of a bus architecture.

A "communication modality" can refer to any protocol- or standard defined or specific communication session or interaction, such as Voice-Over-Internet-Protocol ("VoIP"), cellular communications (e.g., IS-95, 1G, 2G, 3G, 3.5G, 4G, 4G/IMT-Advanced standards, 3GPP, WIMAX™, GSM, CDMA, CDMA2000, EDGE, 1xEVDO, iDEN, GPRS, HSPDA, TDMA, UMA, UMTS, ITU-R, and 5G), Bluetooth™, text or instant messaging (e.g., AIM, Blauk, eBuddy, Gadu-Gadu, IBM Lotus Sametime, ICQ, iMessage, IMVU, Lync, MXit, Paltalk, Skype, Tencent QQ, Windows Live Messenger™ or Microsoft Network (MSN) Messenger™, Wireclub, Xfire, and Yahoo! Messenger™), email, Twitter (e.g., tweeting), Digital Service Protocol (DSP), and the like.

The term "communication system" or "communication network" and variations thereof, as used herein, can refer to a collection of communication components capable of one or more of transmission, relay, interconnect, control, or otherwise manipulate information or data from at least one transmitter to at least one receiver. As such, the communication may include a range of systems supporting point-to-point or broadcasting of the information or data. A communication system may refer to the collection individual communication hardware as well as the interconnects associated with and connecting the individual communication hardware. Communication hardware may refer to dedicated communication hardware or may refer a processor coupled with a communication means (i.e., an antenna) and running software capable of using the communication means to send and/or receive a signal within the communication system. Interconnect refers to some type of wired or wireless communication link that connects various components, such as communication hardware, within a communication system. A communication network may refer to a specific setup of a communication system with the collection of individual communication hardware and interconnects having some definable network topography. A communication network may include wired and/or wireless network having a pre-set to an ad hoc network structure.

The term "computer-readable medium," as used herein refers to any tangible storage and/or transmission medium that participates in providing instructions to a processor for execution. Such a medium may take many forms, including but not limited to, non-volatile media, volatile media, and transmission media. Non-volatile media includes, for example, non-volatile random access memory (NVRAM), or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, read only memory (ROM), a compact disc read only memory (CD-ROM), any other optical medium, punch cards, paper tape, any other physical medium with patterns of holes, a random access memory (RAM), a programmable read only memory (PROM), and erasable programmable read only memory EPROM, a FLASH-EPROM, a solid state medium like a memory card, any other memory chip or cartridge, a carrier wave as described hereinafter, or any other medium from which a computer can read. A digital file attachment to an e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. It should be noted that any computer readable medium that is not a signal transmission may be considered non-transitory.

The terms display and variations thereof, as used herein, may be used interchangeably and can be any panel and/or area of an output device that can display information to an operator or use. Displays may include, but are not limited to, one or more control panel(s), instrument housing(s), indicator(s), gauge(s), meter(s), light(s), computer(s), screen(s), display(s), heads-up display HUD unit(s), and graphical user interface(s). transmission may be considered non-transitory.

The terms "determine," "calculate," and "compute," and variations thereof, as used herein, are used interchangeably and include any type of methodology, process, mathematical operation, or technique.

The Summary of the Invention is neither intended, nor should it be construed, as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description and no limitation as to the scope of the present invention is intended by either the inclusion or non-inclusion of elements or components. Additional aspects of the present invention will become more readily apparent from the Detailed Description, particularly when taken together with the drawings.

BRIEF DESCRIPTION OF THE FIGURES

The accompanying drawings, which are incorporated herein and constitute a part of the specification, illustrate embodiments of the invention and together with the Summary given above and the Detailed Description of the drawings given below serve to explain the principles of these embodiments. In certain instances, details that are not necessary for an understanding of the disclosure or that render other details difficult to perceive may have been omitted. It should be understood, of course, that the invention is not necessarily limited to the particular embodiments illustrated herein. Additionally, it should be understood that the drawings are not necessarily to scale.

FIG. 4A is a schematic view of a wellbore with a solid bridge plug before a hydraulic fracturing treatment of a first stage;

FIG. 4B is a schematic view of the wellbore of FIG. 4A after the hydraulic fracturing treatment of the first stage;

FIG. 4C is another schematic view of the wellbore of FIG. 4B with a flow-through plug set to isolate the first stage during a hydraulic fracturing treatment of a second stage;

FIG. 4D is a schematic view of the wellbore of FIG. 4C after the hydraulic fracturing treatment of the second stage;

Figure 1:
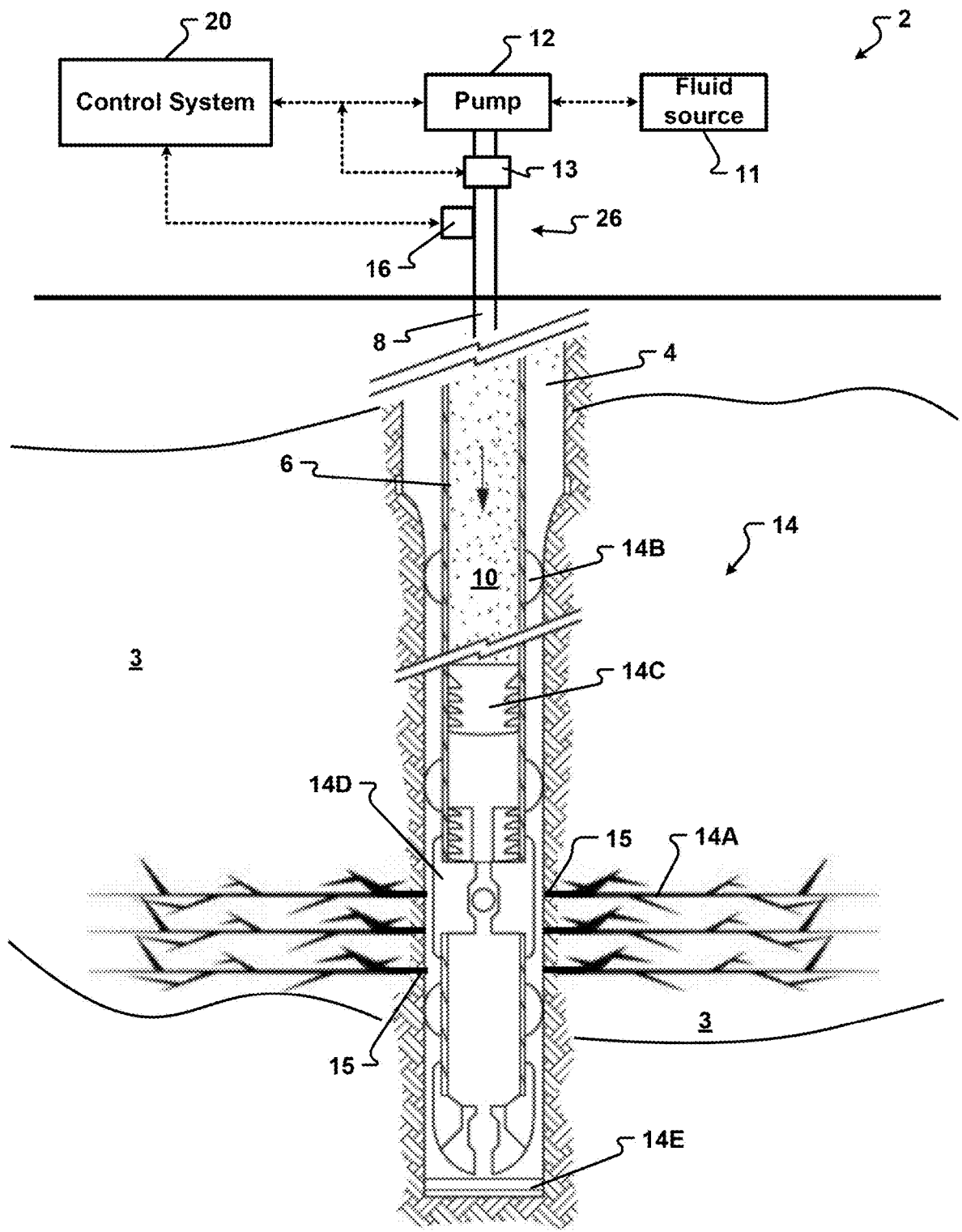
FIG. 1 is a schematic view of a system of the present disclosure associated with a wellbore.

To assist in the understanding of one embodiment of the present disclosure, the following list of components and associated numbering found in the drawings is provided herein:

| Number | Component |
|---|---|
| 2 | System |
| 3 | Geologic formation |
| 4 | Wellbore |
| 6 | Casing |
| 8 | String |
| 10 | Fluid |
| 11 | Fluid source |
| 12 | Pump |
| 13 | Valve |
| 14 | Downhole object |
| 14A | Fracture network |
| 14B | Centralizer |
| 14C | Solid plug |
| 14D | Float Collar |
| 14E | Shoe |
| 14F | Flow-through plug |
| 15 | Perforations |
| 15A | First stage perforations |
| 15B | Second stage perforations |
| 16 | Sensor |
| 17 | Graph of a hydraulic impulse pressure profile |
| 18 | Pressure |
| 19 | Injection rate |
| 20 | Control System |
| 22 | Water hammer or hydraulic impulse |
| 24 | Graph of a hydraulic impulse |
| 26 | Surface boundary |
| 28 | Downhole boundary |
| 28A | Closed downhole boundary |
| 28B | Open downhole boundary |
| 30 | Stage |
| 30A | First stage |
| 30B | Second stage |
| 32 | Change in flow rate ($\Delta Q$) |
| 34 | Change in pressure ($\Delta F$) |
| 36 | Sealing ball |
| 38 | Graph of field data |
| 40 | Graph of windowed data |
| 42 | Graph of detrended data |
| 44 | Graph of the detrended data in the frequency domain |
| 46 | Graph of low frequency detrended data |
| 48 | Peak |
| 48A | Peak 1 (First harmonic) |
| 48B | Peak 2 (Second harmonic) |
| 48C | Peak 3 (Third harmonic) |
| 48D | Peak 4 (Fourth harmonic) |
| 48E | Peak 5 (Fifth harmonic) |
| 48F | Peak 6 (Sixth harmonic) |
| 50 | Method |
| 52 | Start |
| 54 | Prepare the wellbore |
| 56 | Check pressure in the wellbore |
| 58 | Determine if the wellbore is at a first predetermined pressure |
| 60 | Adjust pressure |
| 62 | Record the pressure in the wellbore |
| 64 | Prepare surface lines |
| 66 | Open valve |
| 68 | Collect data on a first hydraulic impulse |
| 70 | Increase pressure to a second predetermined pressure (Optional) |
| 72 | Collect data on a second hydraulic impulse (Optional) |
| 74 | Collect additional data? |
| 76 | Determine the velocity of a hydraulic impulse in the fluid |
| 78 | End |
| 80 | Bus |
| 82 | Processing units or CPUs |
| 84 | Input device |
| 86 | Output device |
| 88 | Storage device |
| 90 | Computer-readable storage media reader |
| 92 | Communications system |
| 94 | Working memory |
| 96 | Processing acceleration unit |
| 98 | Database |
| 100 | Network |
| 102 | Remote database |
| 104 | Operating system |
| 106 | Other code or programs |

DETAILED DESCRIPTION

The present disclosure has significant benefits across a broad spectrum of endeavors. It is the Applicant's intent that this specification and the claims appended hereto be accorded a breadth in keeping with the scope and spirit of the disclosure being disclosed despite what might appear to be limiting language imposed by the requirements of referring to the specific examples disclosed. To acquaint persons skilled in the pertinent arts most closely related to the present disclosure, a preferred embodiment that illustrates the best mode now contemplated for putting the present disclosure into practice is described herein by, and with reference to, the annexed drawings that form a part of the specification. The exemplary embodiment is described in detail without attempting to describe all of the various forms and modifications in which the invention might be embodied. As such, the embodiments described herein are illustrative, and as will become apparent to those skilled in the arts, may be modified in numerous ways within the scope and spirit of the disclosure.

Referring now to FIG. 1, a schematic view of a system 2 of one embodiment of the present disclosure for identifying locations of objects in a wellbore 4 is generally illustrated. The system 2 is operable to determine a distance to a downhole object 14 within the wellbore or to an anomaly in a subterranean geologic formation 3 using pressure data collected on a hydraulic impulse that reflects off of the downhole object.

The wellbore 4 is formed in the geologic formation 3 and can include any combination of horizontal, vertical, curved, and/or slanted sections, including a lateral wellbore, multi-laterals, or other configurations. Additionally, the wellbore 4 can be formed on-shore or off-shore. More specifically, the system 2 of the present disclosure can be used to locate downhole objects in a sub-sea or water-based wellbore 4. Accordingly, the system 2 can be used with a wellbore 4 formed under an ocean, gulf, sea, or any other body of water.

At least a portion of the wellbore 4 can include casing 6. The casing 6 may be cemented in the wellbore 4 at one or more locations. The casing 6 can include multiple casing sections which are connected end-to-end, for example, by a casing collar.

A string 8 can be deployed in the wellbore 4. The string 8 generally includes a tubular conduit to transfer materials, including fluids 10, into and/or out of the wellbore 4. The fluid 10 may be any fluid located within the wellbore. More specifically, the fluid may include, but is not limited to a drilling mud or fluid, a cementitious material, a fracturing fluid, a treatment fluid, or any other fluid or combination of fluids.

One or more downhole objects 14 may be associated with the wellbore. The downhole objects 14 can include a fracture network 14A or downhole tools 14B-14E. Downhole tools that can be located with the system and method of the present disclosure include, but are not limited to, one or more of a centralizer 14B, a plug 14C, a float collar 14D, and a shoe 14E.

The systems and methods of the present disclosure can also be used to identify and locate an inadvertent or unintended fracture, a hole, or a perforation in a casing or other tubular of the wellbore. The fracture, the hole, or the perforation can be unintentionally or inadvertently formed during the assembly, treatment, and testing operations associated with bringing the wellbore into production.

A pump 12 connecting a supply source 11 of the fluid 10 is interconnected to the string 8. The fluid supply source 11 can include one or more tanks. The tanks 11 can be any type of tanks known to those of skill in the art. The pump 12 can be used to create a hydraulic impulse that is transmitted through the fluid. The hydraulic impulse can be created or induced by shutting off the pump 12 or altering an injections rate of the pump. Optionally, the pump 12 is operable to shut off injection of the fluid in one step or in a plurality of steps.

A valve 13 can also be interconnected to the string 8 to isolate the string 8 from the pump 12. The valve may be a frac valve or other valve known to those of skill in the art. The valve 13 can also be actuated to induce a hydraulic impulse in the wellbore. For example, opening the valve 13 to equalize pressure in the wellbore 4 and the associated surface treating equipment can induce a hydraulic impulse. A hydraulic impulse can also be induced by closing the valve 13.

A sensor 16 is associated with the wellbore 4. The sensor 16 is configured to collect data related to the pressure of the fluid within the wellbore. The sensor can be positioned on the wellhead or a surface treating line. More specifically, the sensor 16 is located in a position to connect to or measure pressure of the fluid inside the casing 6, including fluctuations in pressure associated with a hydraulic impulse. The system can include a plurality of sensors 16 located in a variety of positions to sense the pressure of the fluid. The sensor has a predetermined sensitivity to measure fundamental and harmonic frequencies of pressure changes associated with the hydraulic impulse. More specifically, the sensor 16 has a predetermined sensitivity such that the fundamental and harmonic frequencies of the pressure oscillations or changes within the fluid can be measured at a predetermined accuracy.

Optionally, the system 16 can include a sensor 16 on the casing 6 downstream from the valve 13. In one embodiment, a sensor 16 is positioned on a main line downstream from a check valve.

The sensor has a predetermined sample rate. In one embodiment, the sensor is operable to collect data at a sample rate of greater than approximately 1 Hz. In another embodiment, the sensor has a sample rate of at least approximately 30 Hz. Optionally, the sample rate of the sensor can be between approximately 2 Hz and approximately 2 kHz. In one embodiment, the sensor is a quartz-crystal transducer. The sensor can be a dual-quartz pressure transducer. Other suitable sensors 16 are known to those of skill in the art.

The system 2 can include a control system 20. The control system 20 is in communication with the sensor 16. Optionally, the control system 20 can be operable to control one or more of the pump 12 and the valve 13. More specifically, the control system 20 can generate signals to start, stop, reverse, and alter operation of the pump 12. In another embodiment, the control system 20 can send a signal to the pump 12 to alter pressure in the wellbore to generate a hydraulic impulse of a predetermined amplitude in the fluid 10. Additionally, or alternatively, the control system 20 can send a signal to alter a configuration of the valve 13 to create a hydraulic impulse in the fluid 10. The signal from the control system 20 may cause the valve 13 to open or close.

Figure 2:
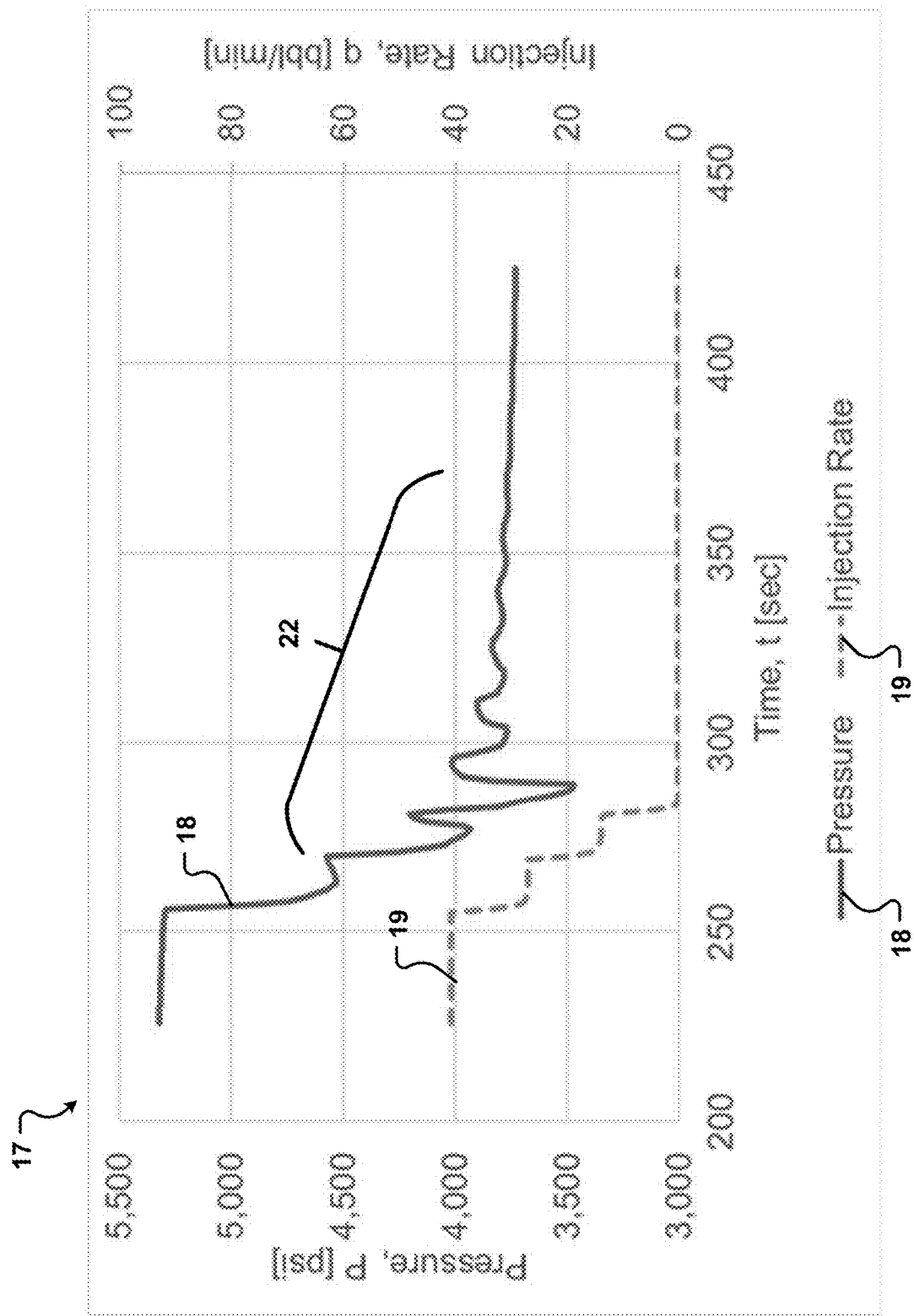
FIG. 2 is a graph of a pressure-transient event known as a "hydraulic impulse" observed in fluid of a wellbore and including reflections off of a downhole object positioned within the wellbore.

Referring now to FIG. 2, a graph 17 of pressure 18 of a fluid in a wellbore 4 in relation to an injection rate 19 of a pump 12 is generally illustrated. When a surface pump 12 used for hydraulic fracturing and other stimulation techniques is shut down, the change in fluid velocity at the wellhead causes a rapid pressure-transient event, known as a "hydraulic impulse" or a "water hammer" to occur in the wellbore 4. The graph 17 illustrates the hydraulic impulse 22 identified in data collected by the sensor 16 of changes in the pressure 18 of the fluid within the wellbore 4. Water hammer events are known in the oil and gas industry and occur regularly in a variety of settings. Pressure waves associated with the water hammer appear as decaying sinusoids on pressure charts as generally illustrated in FIG. 2.

The hydraulic impulse is a hydraulic pressure wave that propagates throughout the hydraulic system associated with the wellbore 4. As generally indicated in the graph 17, the hydraulic impulse decays over time due to energy losses and as the pressure in the wellbore 4 and fracture network equalizes. The hydraulic impulse reflects or oscillates numerous times between a surface boundary 26, such as the wellhead, and a downhole boundary within the wellbore, such as a plug 14C or a fracture network 14A in a geologic formation 3.

Hydraulic impulses may be observed at various times during hydraulic fracturing treatments and can often be observed multiple times during the treatment of a single stage. Fluctuations in the pressure 18 of the fluid associated with the hydraulic impulse 22 caused by a full shutdown of a pump 12 can have amplitudes up to or exceeding 1,000 psi.

The graph 17 illustrates pressure 18 changes after the pump 12 was shut down in several small steps which is known as a step-rate test shutdown (hereinafter "SRT"). An SRT of the pump generally occurs during treatment of a stage. The pump 12 can also be completely shut down in one step which is known as a hard shutdown (or "HSD"). An HSD may also occur during treatment of a stage. A final shutdown of the pump (referred to as an "SD") generally occurs at the end of the treatment of a stage. Hydraulic impulses generated by actuation of the pump 12 originate at the surface and propagate downhole until the wave reaches a downhole boundary. The downhole boundary may be a downhole object (such as a plug 14C or 14E) or a perforation in the casing that is associated with a fracture network 14A. At least some of the energy of the hydraulic impulse is reflected off of the downhole boundary and back up the wellbore.

Hydraulic impulses 22 have a variety of causes, including a rapid negative change in fluid flowrate or a sudden change in pressure at one boundary of the wellbore system. Any event which momentarily excites the hydraulic conduit formed by the wellbore 4 can create a hydraulic impulse 22. Altering the pressure 18 in the wellbore, such as by opening or closing a valve 13 to allow pressure in the wellbore and surface treating equipment to equalize (hereinafter referred to as an "EQU"), can create a hydraulic impulse 22; however, the fluctuations in the pressure 18 of the hydraulic impulse 22 created by actuating a valve for an EQU generally have lower amplitudes compared to shutdown of a pump.

A hydraulic impulse 22 induced in a wellbore 4 before hydraulic fracturing has a waveform that is different from a waveform of a hydraulic impulse induced in the wellbore after hydraulic fracturing. For example, the period of the hydraulic impulse increases in a wellbore after hydraulic fracturing. Accordingly, the hydraulic impulse 22 contains data about conditions within the hydraulic system associated with the wellbore 4, such as locations of downhole boundaries.

Although hydraulic impulses 22 have been observed in wellbores, prior art apparatus used to collect data associated with a hydraulic impulse in a wellbore do not collect data sufficient to accurately determine a hydraulic oscillation frequency. For example, prior art sensors, such as those used during hydraulic fracturing, typically have a sample rate of approximately 1 Hz. The waveform of a hydraulic impulse cannot be accurately captured or characterized at a sample rate of only 1 Hz. Hydraulic impulses observed at a sample rate of 1 Hz have previously been described as clean sinusoidal signals. Further, hydraulic impulses 22 have previously been characterized in the time domain. Accordingly, prior art sensors used to collect data on a hydraulic impulse and methods used to analyze the hydraulic impulse were not useful for locating objects 14 positioned in a wellbore 4 or to determine a location of an anomaly in a subterranean formation.

Figure 3:
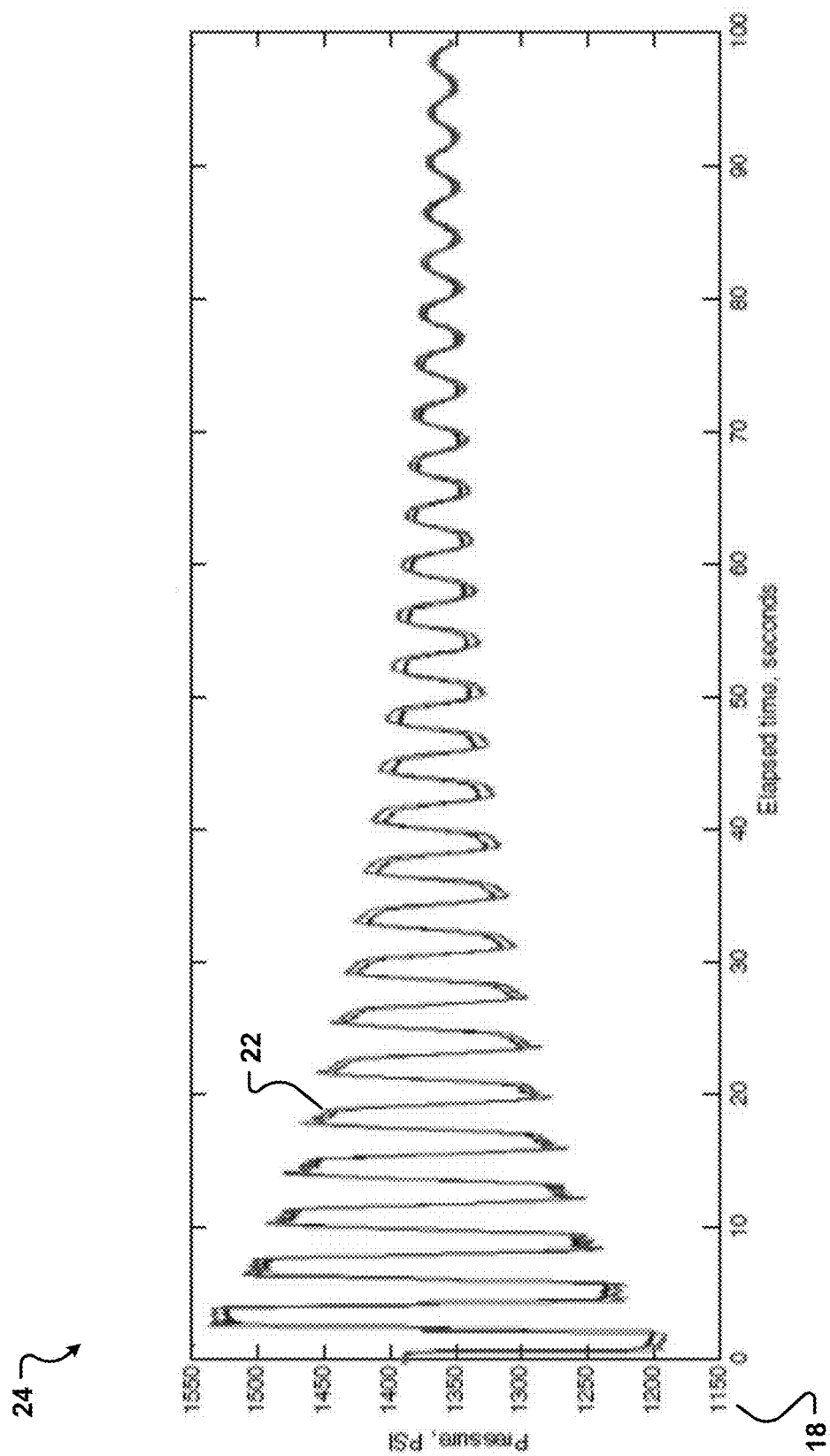
FIG. 3 is a graph of another hydraulic impulse.

Referring now to FIG. 3, a graph 24 of a hydraulic impulse 22 captured by a sensor 16 at a sample rate of approximately 1 kHz is generally illustrated. Pressure 18 of a fluid in the wellbore is indicated on the Y-axis in psi against elapsed time measured in seconds on the X-axis. When data is captured at a sufficient sample rate, multiple contributing frequencies that make up the hydraulic impulse 22 can be observed and identified. As generally illustrated, the hydraulic impulse may have a waveform that is more square than sinusoidal such as described based on observations at sample rates of only 1 Hz.

A hydraulic impulse 22 can be analyzed as a free impulse that has no repeated forcing action. Absent a forcing action inducing a specific frequency of oscillation, free impulses are left to occur at the natural resonant frequencies of the system. The resonant frequencies of any system are a function of system characteristics, such as length, wave velocity, and boundary conditions. In the hydraulic system of a wellbore 4, the wavelength of free pressure oscillations of a hydraulic impulse 22 is a function of the hydraulic length of the hydraulic system and the conditions at the surface boundary and of a downhole boundary.

Referring now to FIGS. 4A-4D, the system 2 of the present disclosure can be used with different conditions of a wellbore 4 throughout a plug and perforation fracturing operation. The corresponding boundary interpretations resulting from the changing conditions of the wellbore are generally illustrated. The downhole boundary 28 represents a point of reflection for a free hydraulic impulse in the wellbore 4. The condition (or type) of the downhole boundary 28 affects the reflection and impulses of the hydraulic impulse 22. A closed boundary 28A (such as a solid bridge plug 14C) that forms a physical boundary downhole reflects the hydraulic impulse 22 differently than reflections from an open boundary 28B (such as a flow-through or bridge plug 14F or reflections from a fracture network 14A).

Referring to FIG. 4A, a wellbore 4 is illustrated with a closed downhole boundary 28A comprising a solid bridge plug 14C. The solid bridge plug isolates a downhole portion of the wellbore including a toe sleeve from perforations 15A formed on the up-hole side of the solid bridge plug. The wellbore 4 of FIG. 4A illustrates a first stage 30A of a hydraulic fracturing treatment before the first stage is pumped to fracture the geologic formation 3. The solid bridge plug forms a closed boundary 28A and acts as a node to flow and an antinode to pressure. The closed boundary 28A causes the fundamental wavelength of the hydraulic impulse to be double the hydraulic length from a surface boundary 26 to the closed downhole boundary 28A defined by the solid bridge plug 14C. Simplified representations of the fundamental wavelength of the system are illustrated in FIG. 4A showing the change in flow rate 32 or $\Delta Q$ and the change in pressure 34 or $\Delta F$.

The surface boundary 26 is generally defined by the furthest point the hydraulic impulse can reach in the hydraulic system of the wellbore. Accordingly, the surface boundary 26 depends on the configuration of equipment at the wellhead. The surface boundary can be the pump 12 or the valve 13. Further, if the valve is open, the surface boundary 26 may be the pump. Generally, the distance between the pump, the valve, and the sensor are known and can be accounted for when determining the location or distance of a downhole object that defines a downhole boundary.

Referring now to FIG. 4B, after the first stage 30A has been pumped during hydraulic fracturing and a fracture network 14A has been induced in the geologic formation 3, the bridge plug 14C no longer forms the downhole boundary. Instead, the fracture network 14A forms the downhole boundary and is considered to be an open boundary 28B.

The point of reflection of an open boundary condition is the point at which fluid flows into or out of the hydraulic conduit. For example, the point of reflection of a hydraulic impulse 22 generated by a final shutdown of a pump 12 at the end of hydraulic fracturing of the first stage 30A is the shallowest open perforation 15A through the casing 6 leading to the fracture network 14A. When pressure oscillations occur in the wellbore 4 connected to the open fracture network 14A, fluid can flow into or out of the fracture network to maintain a generally constant pressure and an equalized condition at the open downhole boundary 28B. The fracture network 14A acts as a node to flow and an antinode to pressure. The open downhole boundary 28B thus causes the fundamental wavelength to be four times longer than the hydraulic length of the wellbore 4 from the surface boundary 26 to the shallowest first stage perforation 15A.

Referring now to FIG. 4C, the wellbore 4 is illustrated after a wireline run has been completed to prepare for treatment of a second stage 30B. Perforations 15B have also been formed in the casing 6 although the second stage has not been pumped. A flow-through plug 14F has been set to isolate the first stage 30A from the second stage 30B. The wellbore is illustrated before a sealing ball has been dropped. In this configuration of the wellbore 4, the flow-through plug 14F acts as a new point of flow into or out of the hydraulic conduit and defines an open downhole boundary 28B. The point of reflection of hydraulic impulses 22 is shifted up-hole from the first stage perforations 15A to the depth of the flow-through plug 14F. The fundamental wavelength of the hydraulic system is four times the length from the surface boundary 26 to the flow-through plug 14F.

After a sealing ball 36 is dropped and seated in the flow-through plug 14F, as generally illustrated in FIG. 4D, a type of one-way check valve can be established. The sealing ball 36 and flow-through plug 14F generally prevent the flow of fluid 10 from the second stage 30B into the first stage 30A. However, fluid can still flow from the first stage 30A to the second stage 30B. The wellbore 4 is illustrated in FIG. 4D after the second stage 30B has been pumped during hydraulic fracturing to form a second fracture network 14A. Similar to FIG. 14B, the fracture network 14A of the second stage 30B is connected to the second stage perforations 15B and acts in a capacitive function. The second stage fracture network thus acts as a node to flow and is therefore an antinode to pressure, defining an open boundary 28B positioned up-hole from the flow-through plug 14F. In this configuration of the wellbore, the second stage fracture network causes the fundamental wavelength of the hydraulic system to be four times longer than the hydraulic length from the surface boundary 26 to the shallowest of the second stage perforations 15B.

Figure 5:
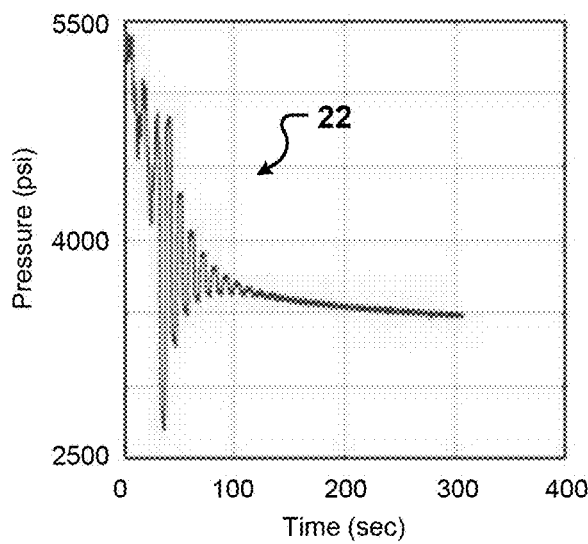
FIG. 5 is a graph of raw data of pressure of a fluid in a wellbore collected over time and illustrating pressure variations of a hydraulic impulse collected in a wellbore according to one embodiment of the present disclosure.

Referring now to FIG. 5, a graph 38 of raw data related to a hydraulic impulse 22 in a wellbore 4 collected by the sensor 16 is illustrated. The raw data comprises pressures of the fluid collected a plurality of times as the hydraulic impulse reflected between a surface boundary and a downhole boundary of the wellbore. The hydraulic impulse 22 illustrated in graph 38 was generated by a final shutdown of the pump 12 at the end of a hydraulic treatment of a first stage of the wellbore. Accordingly, the wellbore 4 had a configuration similar to FIG. 4B and the downhole boundary 28B for the hydraulic impulse is formed by a perforation 15A associated with a fracture network created by the hydraulic fracturing. The downhole boundary is considered to be an open downhole boundary 28B.

Figure 6:
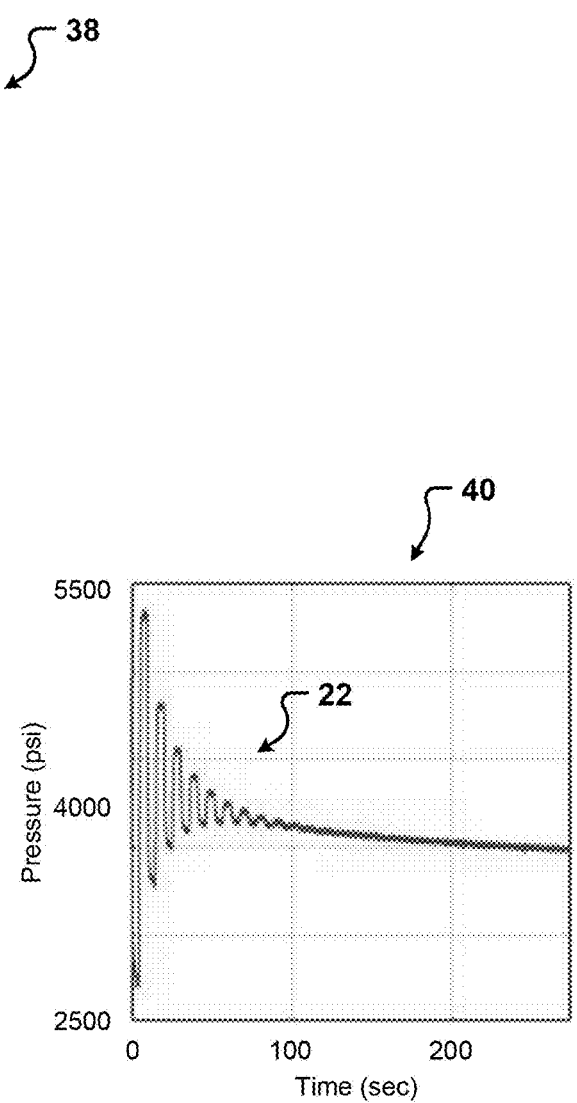
FIG. 6 is a graph of windowed data derived from the raw pressure data of FIG. 5.

Optionally, to prepare the data for processing in the frequency domain, the data from the sensor 16 can be windowed to eliminate irrelevant or noisy pressure data as generally illustrated in graph 40 of FIG. 6. Windowing the data can be used to eliminate data such as from a hydraulic impulse occurring during rate reductions prior to final shutdown of the pump 12, pressure changes caused by valve opening, and pressure changes after the wellbore was isolated from the transducer by valve closing. A user can manually window the data. Optionally, the data can be windowed using software of the control system 20. Additionally, or alternatively, the data can be windowed automatically by the control system 20. The control system 20 can include instructions including a preset algorithm that determines where to start and end the analysis windows based on the behavior of data collected by the sensor 16.

Figure 7:
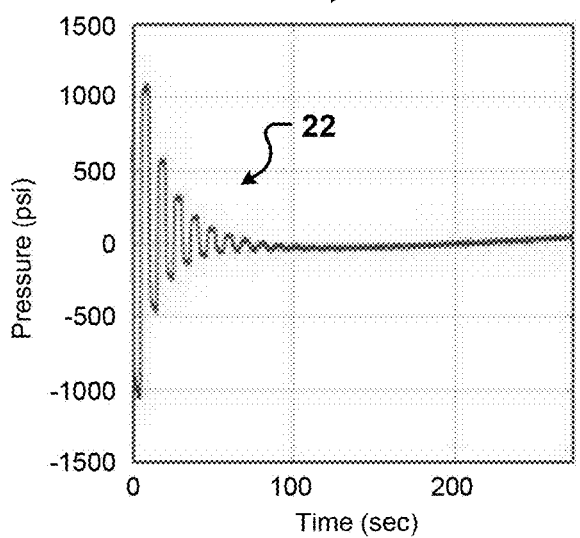
FIG. 7 is a graph of the pressure data from FIGS. 5-6 that has been detrended.

The raw data represented by the graph 38 or the windowed data illustrated in the graph 40 can be detrended as illustrated in FIG. 7. The raw data can be detrended to reduce high amplitude and low-frequency contribution of leakoff to the geologic formation. More specifically, a linear detrending function can be applied to data of the hydraulic impulse. In one embodiment, the data is detrended by fitting a linear equation to the raw data using a regression after the data has been windowed. The linear function is then removed by subtracting the intercept from the raw data and dividing the raw data by the slope. The control system 20 can be programmed in an analytical language to detrend the data. Optionally, commercially available software running on the control system 20 can be used to detrend the data, depending on the deployment. In one embodiment, the control system 20 can use the detrend function of MATLAB® to detrend the sensor data. Other methods of detrending the data known to those of skill in the art may be used with the systems and methods of the present disclosure. For example, the raw data collected from a hydraulic impulse can also be fitted to an exponential decay. The graph 42 of FIG. 7 illustrates the hydraulic impulse with time on the X-axis and change in pressure on the Y-axis. The detrended data is centered at 0 PSI.

The frequency of the pressure oscillations observed by the sensor 16 can be used to measure the distance that the pressure wave has traveled after reflecting off of the downhole boundary 28. As described above, the pressure oscillations are related to the distance from the surface boundary to the downhole boundary through the resonant properties of the configuration of the hydraulic system at the time the hydraulic impulse occurs. Changes in the length of the hydraulic system (such as created by the locations of plugs 14C, 14F, an open fracture network 14A, or an inadvertent hole or perforation in the casing) have different fundamental resonant properties that can be calculated.

Data collected by the sensor 16 related to the hydraulic impulse 22 is characterized by harmonic frequencies. In one embodiment, a Fourier Transform, or a Fast Fourier Transform (hereinafter "FFT"), is used to characterize the sensor data. The FFT, illustrated in equation 1, is an integration of the pressure/time relationship to a complex coefficient:

$$P(\omega) = \int_{-\infty}^{\infty} P(t) e^{j\omega t} dt \quad \text{Equation 1:}$$

where:
t is time in seconds;
j is an imaginary number, or $\sqrt{-1}$
ω is the angular frequency of oscillation in radians per second;
p(t) is pressure as a function of time in psi; and
p(ω) is pressure as a function of frequency in psi.

Pressure signal amplitude contributions from a discrete array of frequencies included in data collected by the sensor 16 can be determined with Equation 1. The fundamental and harmonic frequencies of oscillations within the wellbore 4 are then identified by locating amplitude peaks in the frequency spectrum.

The discrete array of frequencies for which the FFT of Equation 1 is defined are dependent on the sample rate of the data collected by the sensor 16 and the length of time that the signal of the hydraulic impulse 22 is observed. Higher sample rates give a wider range of frequencies. A wider range of frequencies can allow higher harmonic resonant modes to be identified in the data collected from the hydraulic impulse 22. The higher resonant modes have a shorter wavelength and can therefore be used to measure distance more accurately than lower resonant modes which have a longer wavelength. Higher harmonic resonant modes can typically only be identified with a sensor 16 with a sampling rate of at least approximately 2 Hz, or above approximately 2.5 Hz depending upon wellbore conditions and the distance to the downhole object 14. As used herein, the observation time or period refers to a period of time during which the pressure within the wellbore is collected or measured by a sensor 16.

A longer observation time will generally provide more detail to the frequency array. A longer period of observation allows the signal to reflect multiple times within the wellbore 4. Accordingly, the frequencies provided by the Fourier Transform can become more precise as the observation period increases. In one embodiment of the present disclosure, an observation period of up to approximately 5 minutes by the sensor 16 is provided. Sensor data collected in up to 5 minutes can be used to identify two or more harmonic frequencies, and up to six harmonic frequencies in a hydraulic impulse in a wellbore 4 in which the downhole object is approximately 17,000 feet from the surface boundary 26. If the downhole object 14 defining the downhole boundary 28 is shallower, for example about 7,000 feet, 3 minutes of observation time are generally sufficient to collect sensor data necessary to identify the six harmonic frequencies. With the six harmonic frequencies, the distance from the surface boundary 26 to a downhole object 14 can be determined to within approximately 50 feet or less.

In contrast, in a 5 minute observation period using a sensor with a 1 Hz sample rate (such as typically used to monitor a well during hydraulic fracturing) to collect data on pressure in a wellbore as a hydraulic impulse is reflected from an object at a distance of approximately 17,000, the sensor would only be expected to collect data sufficient to identify the first harmonic frequency. Occasionally the 1 Hz sensor may collect data to identify the second harmonic frequency. With this data from the 1 Hz sensor, the distance to the downhole object reflecting the hydraulic wave could only be estimated to approximately 400 feet or more.

Other observation periods may be used with the system 2 and method of the present disclosure. In another embodiment, the observation period is from approximately 1 minute to approximately 15 minutes. In one embodiment, generating an impulse with a predetermined amplitude and which is used to create the water hammer may decrease the amount of time of the observation period.

Figure 8:
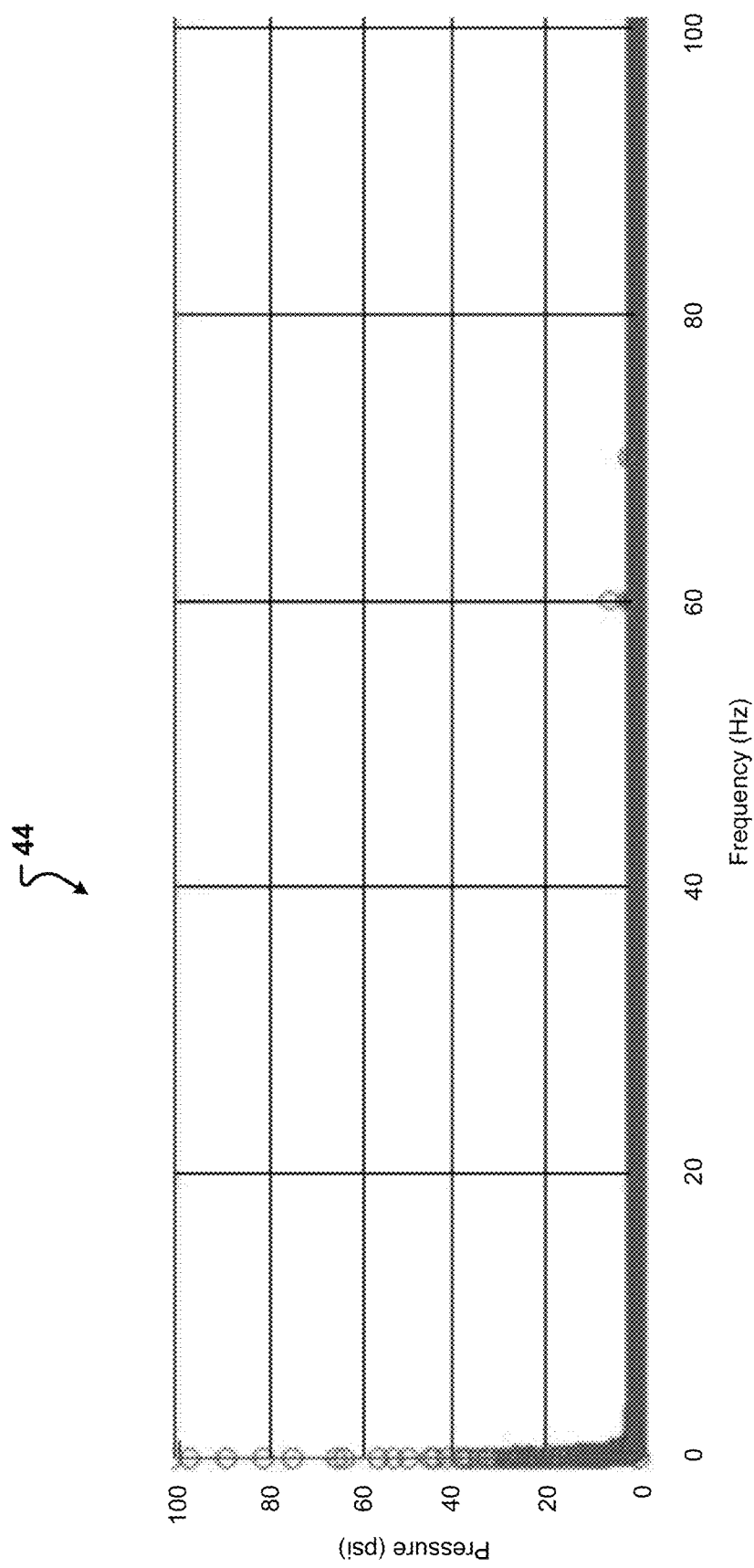
FIG. 8 is a graph of the detrended data of FIG. 7 after the data has been transformed into the frequency domain.
Figure 9:
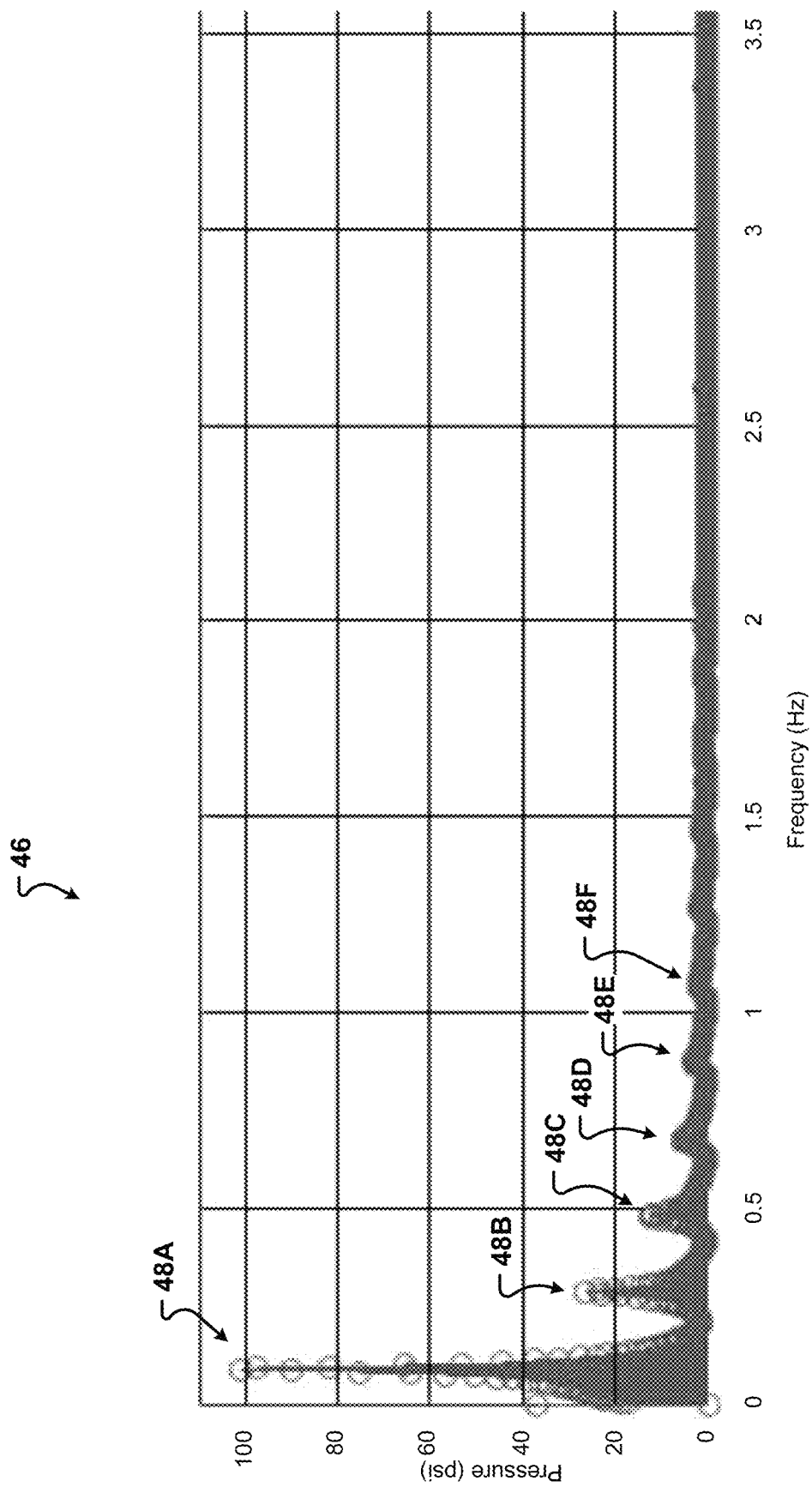
FIG. 9 is a graph of a low frequency portion of the graph of FIG. 8 and illustrating fundamental and harmonic frequencies of oscillations within the wellbore shown as pressure peaks in the frequency spectrum.

Referring now to FIG. 8, a graph 44 of the detrended data is provided transformed to the frequency domain using equation 1. FIG. 9 illustrates a graph 46 of a low frequency portion of the data from graph 44 of FIG. 8. The graphs 44, 46 illustrate the detrended data plotted in the frequency spectrum with frequency in Hertz shown on the X-axis and pressure in PSI shown on the Y-axis. In FIG. 9, six peaks 48A-48F associated with the first-sixth harmonic frequencies of the hydraulic impulse 22 from the graph 38 (FIG. 5) have been identified in the pressure data collected by the sensor 16. When the shutdown impulse that generates the hydraulic impulse has an insufficient amplitude, one or more of the harmonic frequencies represented by peaks 48 may be obscured by noise. The raw frequency components of the six peaks 48A-48F of graph 46 are provided in Table 1, below in Hertz:

TABLE 1

RAW FREQUENCY COMPONENTS
IDENTIFIED BY Fast Fourier Transform

| Freq Peak 1 | Freq Peak 2 | Freq Peak 3 | Freq Peak 4 | Freq Peak 5 | Freq Peak 6 |
|---|---|---|---|---|---|
| 0.094 Hz | 0.294 Hz | 0.494 Hz | 0.689 Hz | 0.889 Hz | 1.089 Hz |

The frequency of each resonant peak increases in the wellbore as the length of the hydraulic system decreases. For example, during hydraulic fracturing of a wellbore, frequencies of resonant peaks in a hydraulic impulse will be higher in a hydraulic impulse associated with treatment of a second stage and will be lower in a hydraulic impulse associated with treatment of a first stage of the wellbore. Accordingly, the component frequencies of hydraulic impulses are dependent upon the length of the hydraulic system.

Because each peak 48 is a higher order harmonic of the fundamental wellbore frequency, the frequencies can be normalized back to fundamental wellbore frequency by applying Equation 2, where $f_1$ is the fundamental frequency, and $f_n$ is the $n^{th}$ harmonic.

$$f_1 = \frac{f_n}{2n-1} \qquad \text{Equation 2}$$

The normalized fundamental frequency components of the data collected from graph 38 and Table 1 are provided in Table 2:

TABLE 2

NORMALIZED FUNDAMENTAL FREQUENCY COMPONENTS

| Freq Peak 1 | Freq Peak 2 | Freq Peak 3 | Freq Peak 4 | Freq Peak 5 | Freq Peak 6 |
|---|---|---|---|---|---|
| 0.094 Hz | 0.098 Hz | 0.099 Hz | 0.098 Hz | 0.099 Hz | 0.099 Hz |

The normalized fundamental frequencies of the peaks 48 can then be correlated to a depth of the downhole object 14. As described above in conjunction with FIG. 5, the data in Table 2 is related to a hydraulic impulse generated by a final shutdown or SD of a pump 12 at the end of a hydraulic treatment of a first stage 30A of a wellbore 4. A perforation 15A in the casing communicating with the fracture network 14A created by the hydraulic fracturing defines an open downhole boundary 28B of the hydraulic impulse. Accordingly, as described in conjunction with FIG. 4B, the distance between the surface boundary 26 (the pump 12, a valve 13 or check valve, or other surface equipment depending on the configuration and location of surface equipment at the well site) and the downhole boundary (the perforation 15A) is ¼ the fundamental wavelength of the hydraulic impulse. The distance to the perforation or plug defining an open downhole boundary 28B (such as when a wellbore 4 is in a configuration as described in conjunction with FIGS. 4B, 4C, and 4D) can be determined using Equation 3:

$$\text{(open downhole boundary): } L = \frac{\alpha}{4f_1} \qquad \text{Equation 3}$$

where:
L is the distance to the downhole boundary (such as a perforation or open plug);
α is the wave velocity; and
$f_1$ is the normalized fundamental frequency.

If the downhole object 14 defines a closed downhole boundary 28A (for example, when the wellbore is configured with a solid plug 14C such as described in conjunction with FIG. 4A), the distance to the downhole object can be determined using Equation 4:

$$\text{(closed downhole boundary): } L = \frac{\alpha}{2f_1} \qquad \text{Equation 4}$$

The wave velocity α used with Equations 3 and 4 can be between approximately 4,500 ft/s and 5,200 ft/s. In one embodiment, the wave velocity used with Equation 3 and 4 can be from approximately 4,550 ft/s and 4,600 ft/s.

Although only one normalized fundamental frequency is required to determine the distance to a downhole object with Equation 3, using more normalized fundamental frequencies can improve the accuracy of the calculated distance to the downhole object. Using only the first normalized fundamental frequency associated with the first peak 48A to identify a reflected depth of the downhole object 14 may provide an indication of the location of the downhole object. However, due to the long wavelength of the first fundamental frequency and to noise included in the signal at the frequency of the first peak, using only the first normalized fundamental frequency to determine the location of a downhole object may not be sufficiently accurate for some applications.

During testing of embodiments of the present disclosure, the first normalized fundamental frequency observed in the frequency spectrum analysis was found to be poorly correlated to the depth of the downhole boundary 28 (the target downhole object 14). Specifically, the first normalized fundamental frequency associated with a first peak 48A is generally not useful for accurately determining the location or depth of a downhole object. When using only the first normalized fundamental frequency associated with the first peak 48A, the calculated distance to the downhole object 14 may be several hundred feet different than the actual distance to the downhole object. For example, in one test of one embodiment, the distance to six downhole objects 14 calculated using only the first normalized fundamental frequency of a hydraulic impulse 22 was determined to be less accurate than distances to the six downhole objects calculated using the second, third, fourth, fifth, and sixth normalized fundamental frequencies. More specifically, $R^2$ was 0.850 when the distances to six downhole objects were determined using only the first normalized fundamental frequency. In contrast, when the second-sixth normalized fundamental frequencies were used to determine the distances to the six downhole objects, $R^2$ was greater than 0.993. This is significant because it establishes the benefit of the systems and methods of the present disclosure for determining distances to downhole objects 14 based on frequency spectrum analysis. In contrast, trying to determine a location of a downhole object 14 in a wellbore using a time domain analysis of a hydraulic impulse 22 may provide an inaccurate result because the only mode that is discernable in the time domain is the first mode related to the first harmonic frequency.

Using Equation 3 and the data of the graph 38, the distance to an uppermost perforation 15A of the first stage 30 for a wellbore configured as generally illustrated in FIG. 4B is between approximately 11,532 feet and approximately 11,659 feet using the normalized fundamental frequencies of the peaks two 48B through six 48F and a wave velocity of from 4,550 ft/s to 4,600 ft/s. Optionally, an average of the normalized fundamental frequencies of peaks two through six may be used with Equation 3. Additionally, or alternatively, one or more of the normalized fundamental frequencies of peaks two through six can be discarded, for example if the normalized fundamental frequency varies by more than a predetermined amount from a mean or average normalized fundamental frequency.

The location of the downhole object 14 may also be determined by estimating the velocity of the hydraulic wave within the wellbore 4. More specifically, Equation 6 can be used to estimate the hydraulic wave velocity within the wellbore:

$$\alpha = \sqrt{\frac{K}{\rho}} \qquad \text{Equation 6}$$

where "α" is the speed of sound in the wellbore fluid, "K" is the bulk modulus of the fluid, and "ρ" is the density of the fluid. As one of skill will appreciate, the accuracy of a location of a downhole object 14 within the wellbore determined using equation 6 depends on accurate values for the fluid bulk modulus and the fluid density.

Figure 10:
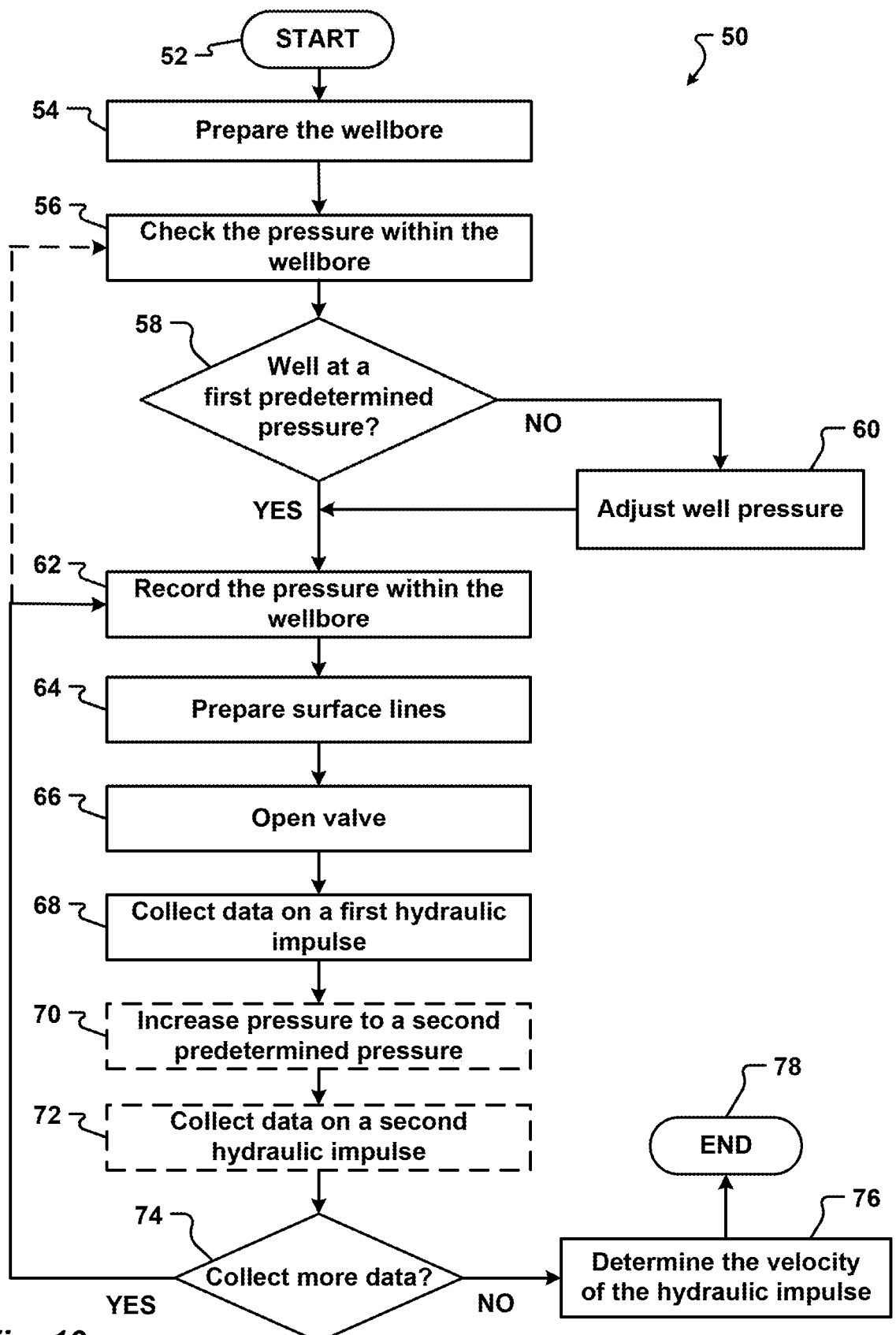
FIG. 10 is a process diagram of a method of determine a velocity of a wave in a fluid within a wellbore according to one embodiment of the present disclosure.

The velocity α of the hydraulic wave can be determined based on data collected by sensor 16 for a hydraulic impulse 22 which has reflected off of a downhole boundary (or downhole object 14) at a known depth within the wellbore 4. For example, and referring now to FIG. 10, an embodiment of a method 50 of determining a velocity α of a hydraulic impulse 22 in a wellbore 4 is generally illustrated. More specifically, method 50 can be used to estimate the wave velocity profile α of a well 4 at one or more pressures. The pressures can be selected based on an expected or likely range of shut-in pressures that may subsequently be used during hydraulic fracturing treatment of the well. A wave velocity profile determined for a particular fluid using the method 50 can subsequently be used with Equations 3 or 4 based on pressure of fluid in the wellbore when a hydraulic impulse is generated. While a general order of the operations of method 50 is shown in FIG. 10, it will be understood by one of skill in the art that the method 50 can include more or fewer operations and can arrange the order of the operations differently than those shown in FIG. 10. Although the operations of the method may be described sequentially, one or more of the operations can in fact be performed in parallel or concurrently. One or more operations of method 50 can be executed as a set of computer-executable instructions executed by a computer system and encoded or stored on a computer readable medium. One example of the computer system can include, for example, the control system 20. Generally, the method 50 starts with a start operation 52 and ends with an end operation 78. Hereinafter, the method 90 shall be explained with reference to the system 2 and components described in conjunction with FIGS. 1-9.

In operation 54 the wellbore 4 is prepared. A solid plug 14C or a flow-through plug 14F can be positioned in the wellbore 4 at a predetermined depth, as generally illustrated in FIGS. 4A and 4C. The depth of the plugs can be measured using a wireline or other means known to those of skill in the art. Operation 54 can also include moving in and rigging up hydraulic horsepower, surface lines, and other equipment. A fluid source or supply 11, such as one or more clean tanks of water or another fluid can be provided. An empty tank for flowback of well completion fluids can also be interconnected to the wellbore 4. A pump 12, a valve 13, and a sensor 16 can also be interconnected to the wellbore. The valve may be a frac valve or other high-pressure isolation valve that can be closed to isolate surface equipment from the wellbore. The valve can include a zipper manifold and/or a check valve. In operation 54, the valve 13 can be closed.

The sensor 16 can be rigged up to record pressure within the wellbore 4. Optionally, the sensor is a digital pressure transducer. A first sensor 16 can be interconnected to the wellhead casing valve below a frac valve. A second sensor 16 may optionally be interconnected to the main line downstream from the check valve. The sensor 16 can be interconnected to the control system 20 or other monitoring equipment.

In operation 56, the pressure within the wellbore 4 is checked with the sensor 16. Optionally, the pressure may be recorded.

In operation 58, the system determines if the fluid 10 within the wellbore 4 is at a predetermined pressure. In one embodiment, the predetermined pressure is between approximately 1,000 PSI and 2,000 PSI. If the pressure is not at the predetermined pressure, method 50 can proceed NO to operation 60. If the pressure is at the predetermined pressure, the method 50 can proceed YES to operation 62.

The pressure within the wellbore 4 can be adjusted to the predetermined pressure in operation 60. If the pressure is below the predetermined pressure, a valve to the surface lines can be opened. The pressure within the wellbore can then be increased to the predetermined pressure. Optionally, the pump 12 can be activated to inject fluid into the wellbore 4. When the predetermined pressure is reached, the pump 12 can be shutdown. The valve 13 (such as the frac valve) can also be closed.

Alternatively, if the pressure in the wellbore 4 is above the predetermined pressure, the pressure can be reduced in operation 60. For example, a valve 13 associated with a flowback tank can be opened to bleed down the well to the predetermined pressure. When the pressure in the wellbore has been reduced to the predetermined pressure, the valve of the flowback tank can be closed. The well can then be isolated from flowback lines and surface lines. Optionally, the frac valve can be closed.

In operation 62, the pressure in the wellbore can be recorded. In operation 64, surface lines associated with the wellbore are prepared. This can include checking the pressure within the surface lines and adjusting the pressure within the surface lines to be approximately 500 PSI less than the pressure in the wellbore recorded in operation 62. Optionally, the pressure of the surface lines should be at least approximately 500 PSI below the wellbore pressure. In one embodiment, the pressure of the surface lines should not be more than 1,500 PSI below the wellbore pressure. If the pressure of the surface lines is too high, a valve associated with the surface lines can be opened to reduce (or bleed down) the pressure. Alternatively, if the pressure in the surface lines is too low, the pressure in the surface lines can be increased. When the pressure of the surface lines is approximately 500 PSI less than the pressure of the wellbore, the pressure of the surface lines can be recorded.

In operation 66, the valve 13 is opened to equalize pressure between the wellbore 4 and the surface lines. In one embodiment, operation 66 can include opening a frac valve 13.

In operation 68, a pressure of the fluid in the well is collected by a sensor 16 for a period of time. The sensor can collect pressure data associated with pressure fluctuations of a hydraulic impulse 22 generated by opening the valve 13 in operation 66. The hydraulic impulse 22 generated by operation 66 is an equalization type, or "EQU", hydraulic impulse as described herein. Operation 68 can continue for a predetermined period of time. Optionally, the sensor 16 can collect data during operation 68 for at least approximately 5 minutes. The data collected by the sensor 16 can be transmitted to the control system 20. In one embodiment, the data is transmitted by a wireless connection to the control system.

Optionally, in operation 70, pressure within the wellbore 4 is increased to a second predetermined pressure. The pump 12 can be activated to load the wellbore 4 with additional fluid. The pressure within the wellbore is monitored until the pressure is at the second predetermined pressure. The second predetermined pressure can be greater than the first predetermined pressure. For example, the second predetermined pressure can be approximately 1,000 PSI greater than the first predetermined pressure. Optionally, the second predetermined pressure can be between approximately 2,000 PSI and approximately 3,000 PSI.

When the pressure is at the second predetermined pressure, the pump 12 can be shut down. Additionally, or alternatively, the valve 13 can be closed. One or more of these actions can create a second hydraulic impulse 22. The second hydraulic impulse 22 may be the same as, or similar to, a hard shutdown hydraulic impulse (or an "HSD") such as frequently observed during shutdown of a pump during hydraulic fracturing of a stage. The pressure in the wellbore can optionally be recorded in conjunction with operation 70.

Additionally, or alternatively, in optional operation 72, the sensor 16 can collect data on the second hydraulic impulse. The pressure fluctuations associated with the second hydraulic impulse 22 can be monitored and recorded by the sensor 16 for a predetermined period of time. Optionally, the predetermined period of time can be at least approximately 5 minutes. The data from the sensor related to the second hydraulic impulse can be provided to the control system 20.

In operation 74, the system can determine whether to collect more data. If no additional data will be collected, method 50 can continue NO to operation 76. Alternatively, if more data should be collected, method 50 can return YES to operation 62, or optionally to operation 56. In this manner, one or more of operations 56 to 72 can be repeated one or more times. In one embodiment, during each loop of method 50 to operations 56 or 62, the first and second predetermined pressures can be increased. For example, during a first loop, the first and second predetermined pressures can be increased by approximately 1,000 PSI. In one embodiment, method 50 loops one or more times such that data on hydraulic impulses is recorded when the pressure within the wellbore is between at least one of: approximately 1,000 PSI and 2,000 PSI; approximately 2,000 PSI and 3,000 PSI; approximately 3,000 PSI and 4,000 PSI; and approximately 4,000 PSI and 5,000 PSI.

In operation 76, the velocity of a hydraulic impulse in the fluid is determined. One of equations 3 and 4 can be used by solving for L. More specifically, if the downhole boundary within the wellbore 4 is an open downhole boundary, equation 3 can be used to determine the wave velocity α using the know distance L to the downhole open boundary 28B and the normalized fundamental frequency $f_1$ of the hydraulic impulse. Alternatively, if the wellbore includes a closed downhole boundary 28A, such as by including solid plug 14C, equation 4 can be used to determine wave velocity α.

Additionally, or alternatively, the wave velocity can be calculated in operation 76 with Equation 5:

$$\alpha = 4\frac{L}{T} \qquad \text{Equation 5}$$

where α is the wave velocity, L is the length of the conduit, and T is the period of the wave.

Method 50 can then end with operation 78. The velocity of the hydraulic impulse, or the wave velocity α, can then be used to identify locations of objects of unknown depth using equations 3 and 4 as described herein.

Figure 11:
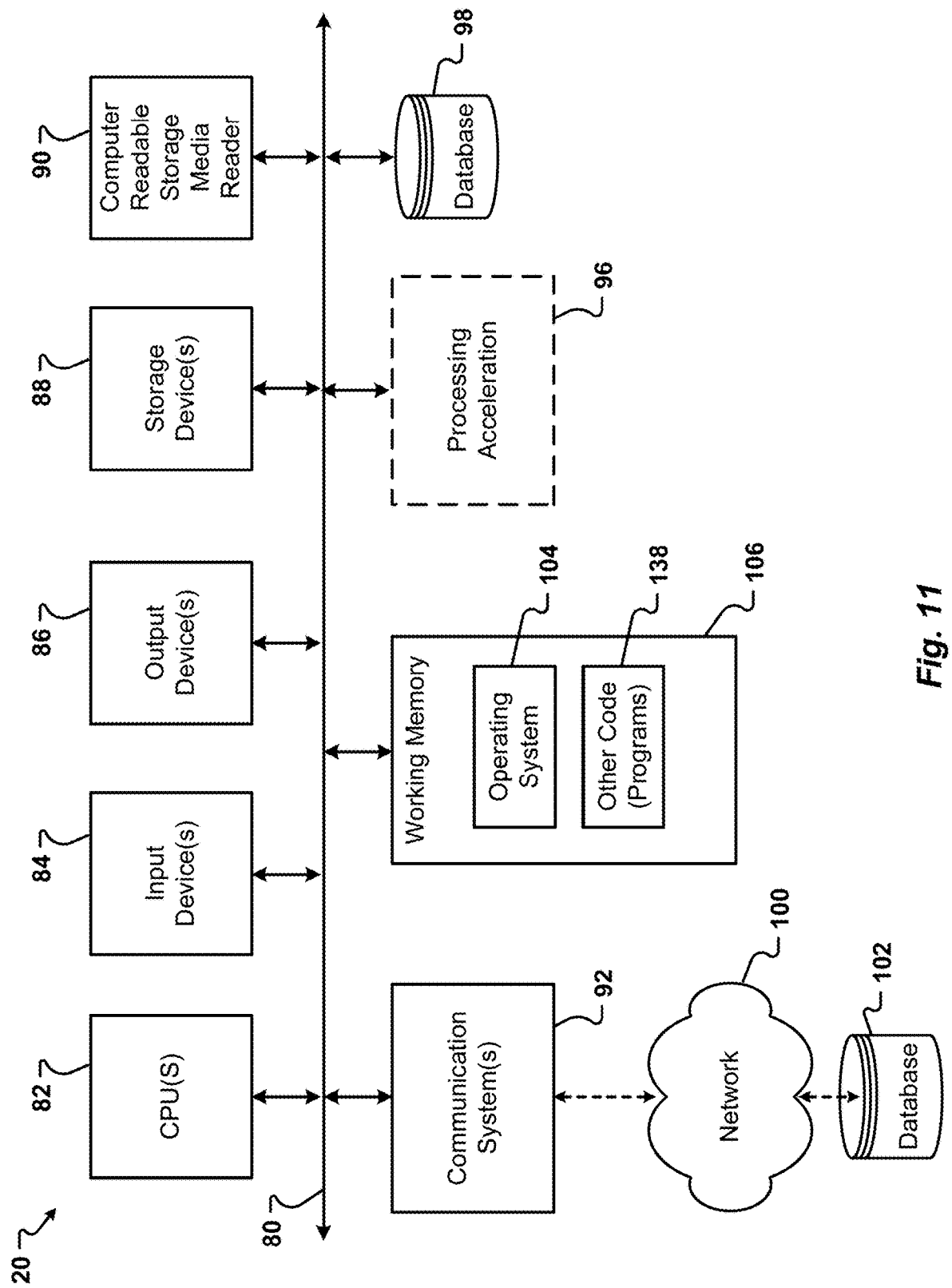
FIG. 11 is a block diagram of an embodiment of a control system of the present disclosure.

Referring now to FIG. 11, a control system 20 of one embodiment of the present disclosure is generally illustrated. More specifically, FIG. 11 generally illustrates one embodiment of a control system 20 of the present disclosure operable to control the system 2 of the present disclosure. The control system 20 is generally illustrated with hardware elements that can be electrically coupled via a bus 80. The hardware elements may include a central processing unit (CPU) 82; an input device 84 (e.g., a mouse, a keyboard, etc.); and an output device 86 (e.g., a display device, a printer, etc.). The control system 20 can also include a storage device 88. In one embodiment, the storage device(s) 88 can be disk drives, optical storage devices, solid-state storage device such as a random access memory ("RAM") and/or a read-only memory ("ROM"), which can be programmable, flash-updateable and/or the like.

The control system 20 can additionally include one or more of a computer-readable storage media reader 90; a communications system 92 (e.g., a modem, a network card (wireless or wired), an infra-red communication device, etc.); and working memory 94, which can include RAM and ROM devices as described herein. In some embodiments, the control system 20 can also include a processing acceleration unit 96, which can include a DSP, a special-purpose processor and/or the like. Optionally, the control system 20 can also include a database 98.

The computer-readable storage media reader 90 can further be connected to a computer-readable storage medium, together (and, optionally, in combination with storage device(s) 88) comprehensively representing remote, local, fixed, and/or removable storage devices plus storage media for temporarily and/or more permanently containing computer-readable information. The communications system 92 can permit data to be exchanged with a network 100 and/or any other data-processing. Optionally, the control system 20 can access data stored in a remote storage device, such as database 102 by connection to the network 100. In one embodiment, the network 100 may be the internet.

The control system 20 can also comprise software elements, shown as being currently located within the working memory 94. The software elements can include an operating system 104 and/or other code 106, such as program code implementing one or more methods and aspects of the present disclosure.

One of skill in the art will appreciate that alternate embodiments of the control system 20 can have numerous variations from that described above. For example, customized hardware might also be used and/or particular elements might be implemented in hardware, software (including portable software, such as applets), or both. Further, connection to other computing devices such as network input/output devices can be employed.

Suitable control systems 20 are known to those of skill in the art. In one embodiment, the control system 20 is a personal computer, such as, but not limited to, a personal computer running the MS Windows operating system. Optionally, the control system 20 can be a smart phone, a tablet computer, a laptop computer, and similar computing devices. In one embodiment, the control system 20 is a data processing system which includes one or more of, but is not limited to: an input device (e.g. a keyboard, mouse, or touch-screen); an output device (e.g. a display, a speaker); a graphics card; a communication device (e.g. an Ethernet card or wireless communication device); permanent memory (such as a hard drive); temporary memory (for example, random access memory); computer instructions stored in the permanent memory and/or the temporary memory; and a processor.

The system 2 and methods of the present disclosure provide many benefits. Referring again to FIG. 4D, after a hydraulic fracturing treatment of the second stage 30B of the exemplary wellbore 4, a hydraulic impulse 22 generated when the pump 12 is shut down or when a valve 13 is closed should reflect from the second stage perforations 15B and the associated fracture network 14A if they hydraulic fracturing treatment was successful. However, if the distance to the downhole boundary determined using Equation 3 is greater than the planned upper boundary of the planned treatment for the second stage (such as the recorded depth at which the top perforation 15B was formed), the hydraulic fracturing treatment may have failed. For example, the flow through plug 14F may have moved deeper into the wellbore 4. Failure of isolation caused by unintended movement of the flow through plug can decrease stimulation efficiency of the second stage 30B by allowing excess volumes of proppant and treatment fluids to be pumped into previously treated downhole stages. In the example illustrated in FIG. 4D, failure of the flow through plug 14F could cause treatment fluids and proppant to be packed into the fracture network of the first stage 30A rather than the second stage 30B as planned.

Failure of a plug identified in hydraulic impulse data using the systems and methods of the present disclosure can be used to inform an operator about the function or failure of isolation tools in real-time. When the hydraulic impulse data indicates an isolation plug has failed, the operator can then address the problem before the remaining stages in the well are completed. For example, the operator could set another plug to replace the failed plug and perform the hydraulic treatment of the stage a second time. Alternatively, the operator could decide to lower a diagnostic or logging tool into the wellbore to evaluate the condition of the wellbore at the failed stage.

Failure of a flow-through bridge plug was observed during testing of one embodiment of the systems and methods of the present disclosure. More specifically, after isolation and treatment of a fourth stage of a well, data was collected on a hydraulic impulse generated during final shut-down of the pump. The reflection depth of the downhole boundary was determined to be 129 feet lower than the recorded top perforation formed for the fourth stage. The fourth stage flow-through plug was not tagged during drill-out, suggesting that the plug failed. This indicates that the perforations formed for the fourth stage did not receive treatment fluids or proppant during the hydraulic fracturing treatment conducted for the fourth stage. Instead, the treatment fluids and proppant meant for the fourth stage may have been injected into the third stage. The isolation failure of the fourth stage plug is reflected in the hydraulic impulse data collected during the stage.

Additionally, if the treatment of the second stage 30B was not successful, the planned fracture network 14A for the second stage may not be sufficiently porous to behave as an open downhole boundary. In this case, the downhole boundary of the hydraulic impulse generated when the pump is shut down at the end of the treatment of the second stage may be the flow through plug 14F. Accordingly, if the distance from the surface boundary 26 to a downhole boundary provided by Equation 3 at the end of a hydraulic treatment of the second stage is equal to the depth at which a flow through plug 14F was positioned prior to treatment of the second stage 30B (as illustrated in FIGS. 4C, 4D), the hydraulic fracturing of the second stage may not have been successful. The system and methods of the present disclosure thus can be used to verify that hydraulic treatment of a stage occurred at a planned location without unintended movement of an isolation plug (such as a solid plug 14C or a flow-through plug 14F) without requiring additional equipment to be placed in the wellbore and without additional entry into the wellbore.

To provide additional background, context, and to further satisfy the written description requirements of 35 U.S.C. § 112, the following references are incorporated by reference herein in their entireties: U.S. Pat. Nos. 4,802,144; 4,907,204; 5,093,811; 5,170,378; 6,364,015; 7,100,688; 7,313,481; 7,770,639; 8,838,427; 8,991,505; 9,624,764; 10,030,497; U.S. Patent App. Pub. 2016/0082405; U.S. Patent App. Pub. 2017/0096891; U.S. Patent App. Pub. 2018/0094521; PCT Publication WO2018/004369; PCT Publication WO2018/035400; Connor J. Clark, Jennifer L. Miskimins, and Dana L. Gallegos, Diagnostic Applications of Borehole Hydraulic Signal Processing, Unconventional Resources Technology Conference, Houston, Tex., 23-25 Jul. 2018: pp. 2668-2685, available at https://library.seg.org/doi/pdf/10.15530/urtec-2018-2902141; Michael A. Carey et al., Analysis of Water Hammer Signatures for Fracture Diagnostics, SPE-174866-MS (2015), available at https://www.onepetro.org/conference-paper/SPE-174866-MS; Michael A. Carey, Thesis: Water Hammer Fracture Diagnostics (2014), available at https://repositories.lib.utexas.edu/handle/2152/28297; Connor J. Clark, Frequency Spectrum Analysis of Water Hammer Events During Hydraulic Fracturing and the Associated Diagnostic Applications, (2017), available at https://mountainscholar.org/handle/11124/172155; Afshar, M. H., Rohani, M., Water Hammer Simulation by Implicit Method of Characteristics, International Journal of Pressure Vessels and Piping, Volume 85, Issue 12: 851-859 (December 2008), available at http://dx.doi.org/10.1016/j.ijpvp.2008.08.006; Dunham, E. M., Harris, J. M., Z hang, J., Quan, Y. and Mace, K., Hydraulic Fracture Conductivity Inferred from Tube Wave Reflections, SEG-2017-17664595, SEG International Exposition and Annual Meeting, 24-29 Sep. 2017, Houston, Tex., available at https://library.seg.org/doi/abs/10.1190/segam2017-17664595.1; and Iriarte, J., Merritt, J., and Kreyche, B., Using Water Hammer Characteristics as a Fracture Treatment Diagnostic, SPE-185087-MS, Oklahoma City Oil and Gas Symposium, 27-30 Mar. 2017, Oklahoma City, Okla., available at https://doi.org/10.2118/185087-MS.

While various embodiments of the disclosed device have been described in detail, it is apparent that modifications and alterations of those embodiments will occur to those skilled in the art. However, it is to be expressly understood that such modifications and alterations are within the scope and spirit of the present disclosure, as set forth in the following claims. Further, the invention(s) described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

The foregoing discussion has been presented for purposes of illustration and description. The foregoing is not intended to limit the disclosure to the form or forms disclosed herein. In the foregoing description for example, various features of the disclosure have been identified. It should be appreciated that these features may be combined together into a single embodiment or in various other combinations as appropriate. The dimensions of the component pieces may also vary, yet still be within the scope of the disclosure. Moreover, though the description has included description of one or more embodiments and certain variations and modifications, other variations and modifications are within the scope of the disclosure, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

While the exemplary aspects, embodiments, options, and/or configurations illustrated herein show the various components of the system collocated, certain components of the system can be located remotely, at distant portions of a distributed network, such as a local area network (LAN) and/or the Internet, or within a dedicated system. Thus, it should be appreciated, that the components of the system can be combined in to one or more devices, such as a Personal Computer (PC), laptop, netbook, smart phone, Personal Digital Assistant (PDA), tablet, etc., or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a private branch exchange (PBX) and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information.

Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects. Further, a number of variations and modifications of the disclosure can be used. It would be possible to provide for some features of the disclosure without providing others.

Optionally, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In one embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or very-large-scale-integration (VLSI) design. Whether software or hardware is used to implement the systems in accordance with this disclosure is dependent on the speed and/or efficiency requirements of the system, the particular function, and the particular software or hardware systems or microprocessor or microcomputer systems being utilized In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or computer-generated imagery (CGI) script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

The present disclosure, in various embodiments, includes components, methods, processes, systems and/or apparatus substantially as depicted and described herein, including various embodiments, subcombinations, and subsets thereof. Those of skill in the art will understand how to make and use the devices of the disclosure after understanding the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation. Rather, as the following claims reflect, inventive aspects lie in less than all features of any single foregoing disclosed embodiment.

What is claimed is:

1. A method of locating a position of a downhole object in a wellbore or an anomaly in a subterranean formation, comprising:
   generating a hydraulic impulse in a fluid in the wellbore, wherein the hydraulic impulse reflects between a surface boundary and a downhole boundary, and wherein the downhole boundary is one of the downhole object or the formation anomaly;
   collecting data at a wellhead of the wellbore on pressure in the fluid as the hydraulic impulse reflects between the surface boundary and the downhole boundary, wherein the data is collected by a sensor at a sample rate of greater than 1.5 Hz;
   transforming the collected data into frequency domain data;
   identifying component frequencies in the frequency domain data, wherein the component frequencies are associated with pressure peaks in the frequency domain data;
   determining a second normalized fundamental frequency of the hydraulic impulse by normalizing a component frequency of a second pressure peak identified in the frequency domain data, wherein the second pressure peak has a second frequency value that is higher than a first frequency value of a first pressure peak, and wherein the second normalized fundamental frequency of the hydraulic impulse is determined using Equation 1:

$$f_1 = \frac{f_n}{2n-1}$$

where $f_1$ is the normalized fundamental frequency, and $f_n$ is the $n^{th}$ harmonic;
determining a velocity of a wave in the wellbore; and
determining a distance from the surface boundary to the downhole boundary using the wave velocity, the second normalized fundamental frequency, and either equation 2A (when the wellbore has an open downhole boundary) or equation 2B (when the wellbore has a closed downhole boundary):

$$L = \frac{\alpha}{4f_2} \qquad \text{Equation 2A}$$

$$L = \frac{\alpha}{2f_2} \qquad \text{Equation 2B}$$

where:
L is the distance;
$\alpha$ is the wave velocity; and
$f_2$ is the second normalized fundamental frequency.

2. The method of claim 1, wherein the downhole object is an isolation plug in the wellbore.

3. The method of claim 1, wherein generating the hydraulic impulse comprises one or more of altering a flow rate of a pump injecting fluid into the wellbore, opening a valve, and closing a valve.

4. The method of claim 1, further comprising detrending the collected data by fitting a linear equation to the collected data, wherein the detrending is performed before transforming the collected data into frequency domain data.

5. The method of claim 1, wherein transforming the collected data into frequency domain data comprises applying a Fourier transform to the collected data according to Equation 3:

$$P(\omega) = \int_{-\infty}^{\infty} P(t)e^{j\omega t}dt$$

where:
t is time in seconds;
j is an imaginary number;
$\omega$ is an angular frequency of oscillation in radians per second;
p(t) is pressure as a function of time in psi; and
p($\omega$) is pressure as a function of frequency in psi.

6. The method of claim 1, further comprising determining if the fluid in the wellbore is at a predetermined pressure of between 1,000 PSI and 2,000 PSI prior to generating the hydraulic impulse, and wherein when the fluid is not at the predetermined pressure the method further comprises adjusting the pressure of the fluid in the wellbore to the predetermined pressure.

7. The method of claim 1, wherein the sensor has an accuracy of +/−0.025% of a measured value.

8. The method of claim 1, wherein the sample rate of the sensor is greater than approximately 10 Hz.

9. The method of claim 8, wherein the sample rate of the sensor is between 25 Hz and approximately 75 Hz.

10. The method of claim 1, further comprising:
discarding the first pressure peak identified in the frequency domain data.

11. The method of claim 1, wherein the formation anomaly is one or more of: a fracture depth, a fracture density, a fracture length, a fracture permeability, a fracture flow characteristic, a perforation density, and a penetration depth.

12. A non-transitory computer readable medium comprising a set of instructions stored thereon that, when executed by a processor of a control system, cause the processor to determine a distance to a downhole object in a wellbore or a characteristic of a subterranean formation, comprising:
an instruction to receive data collected over time on pressure in a fluid within the wellbore, wherein the data is collected at or near a wellhead of the wellbore, and wherein the pressure data is collected as a hydraulic impulse reflects in the wellbore between a downhole boundary and a surface boundary;
an instruction to detrend the received pressure data by fitting a linear equation to the collected data, wherein detrending the received pressure data reduces one or more of high amplitude and low-frequency contribution of leakoff to the subterranean formation;
an instruction to transform the detrended pressure data into frequency domain data;
an instruction to identify a second component frequency in the frequency domain data;
an instruction to normalize the second component frequency to determine a second normalized fundamental frequency using Equation 1:

$$f_1 = \frac{f_n}{2n-1}$$

where $f_1$ is the normalized fundamental frequency, and $f_n$ is the $n^{th}$ harmonic; and
an instruction to determine a distance to the downhole boundary using Equation 2A (when the downhole boundary is open) or Equation 2B (when the downhole boundary is closed) based on a velocity of a wave in the wellbore and at least the second normalized fundamental frequency:

$$L = \frac{\alpha}{4f_2} \qquad \text{Equation 2A}$$

$$L = \frac{\alpha}{2f_2} \qquad \text{Equation 2B}$$

where:
L is the distance;
$\alpha$ is the wave velocity; and
$f_2$ is the second normalized fundamental frequency.

13. The non-transitory computer readable medium of claim 12, further comprising an instruction to apply a Fourier transform to the detrended data to transform the received data into the frequency domain data using Equation 3:

$$P(\omega) = \int_{-\infty}^{\infty} P(t)e^{j\omega t}dt$$

where:
t is time in seconds;
j is an imaginary number;
ω is an angular frequency of oscillation in radians per second;
p(t) is pressure as a function of time in psi; and
p(ω) is pressure as a function of frequency in psi.

14. The non-transitory computer readable medium of claim 12, further comprising:
an instruction to identify the pressure of the fluid within the wellbore before the hydraulic impulse is generated; and
an instruction to activate a pump located at the wellhead to increase the pressure within the fluid to at least 1,000 PSI if the pressure of the fluid within the wellbore is less than 1,000 PSI, and an instruction to open a valve located at the wellhead to lower the pressure to at most 2,000 PSI if the pressure of the fluid within the wellbore is greater than 2,000 PSI.

15. The non-transitory computer readable medium of claim 12, wherein the data is collected by a sensor at a sample rate of greater than 1.5 Hz.

16. A system configured to determine a location of a downhole object in a wellbore or a characteristic of a subterranean formation, comprising:
a sensor to collect data over time on pressure of a fluid within the wellbore, the sensor positioned at or near a wellhead of the wellbore and located a predetermined distance from a surface boundary, wherein the pressure data is collected as a hydraulic impulse travels in the wellbore between a downhole boundary and the surface boundary, the sensor being operable to collect data at a sample rate of at least about 1.5 Hz;
a pump and a valve located at the wellhead of the wellbore, the surface boundary being one of the pump and the valve; and
a control system including at least a memory, a processor in communication with the memory, and instructions stored on the memory and executable by the processor, the control system operable to:
receive the pressure data collected by the sensor;
fit a linear equation to the pressure data to provide detrended pressure data;
transform the detrended pressure data into frequency domain data; and
normalize a second component frequency in the frequency domain data to determine a second normalized fundamental frequency using Equation 1:

$$f_1 = \frac{f_n}{2n-1}$$

where $f_1$ is the normalized fundamental frequency, and $f_n$, is the $n^{th}$ harmonic; and
determine a distance to the downhole boundary using Equation 2A (when the downhole boundary is an open boundary) or Equation 2B (when the downhole boundary is a closed boundary) based on a velocity of a wave in the wellbore and at least the second normalized fundamental frequency:

$$L = \frac{\alpha}{4f_2} \qquad \text{Equation 2A}$$

$$L = \frac{\alpha}{2f_2} \qquad \text{Equation 2B}$$

where:
L is the distance;
α is the wave velocity; and
$f_2$ is the second normalized fundamental frequency.

17. The system of claim 16, wherein the control system is further operable to determine at least one harmonic frequency in the pressure data collected by the sensor.

18. The system of claim 16, wherein the control system is further operable to apply a Fourier transform to the detrended pressure data to transform the detrended pressure data into the frequency domain data.

19. The system of claim 16, wherein the control system is further operable to determine the pressure of the fluid within the wellbore before the hydraulic impulse is reflected off the downhole boundary.

20. The system of claim 19, wherein the control system is further operable to control the pump to adjust the pressure of the fluid within the wellbore.

21. The system of claim 16, wherein sample rate of the sensor is greater than approximately 10 Hz.

* * * * *